United States Patent [19]
Ito et al.

[11] Patent Number: 5,748,179
[45] Date of Patent: May 5, 1998

[54] LCD DEVICE HAVING DRIVING CIRCUITS WITH MULTILAYER EXTERNAL TERMINALS

[75] Inventors: Hikaru Ito; Masataka Natori; Masahiko Suzuki; Kimitoshi Ohgiichi, all of Mobara; Kuniyuki Matsunaga, Yokohama; Junichi Ohwada, Mobara; Masumi Sasuga, Mobara; Shiro Ueda, Mobara, all of Japan

[73] Assignee: Hitachi, Ltd., Tokyo, Japan

[21] Appl. No.: 645,484

[22] Filed: May 13, 1996

[30] Foreign Application Priority Data

May 15, 1995 [JP] Japan .................................. 7-115583
Sep. 11, 1995 [JP] Japan .................................. 7-232290

[51] Int. Cl.⁶ ........................................ G02F 1/1345
[52] U.S. Cl. ................................... 349/152; 349/149
[58] Field of Search ................................ 349/149, 150, 349/151, 152

[56] References Cited

U.S. PATENT DOCUMENTS

| | | | |
|---|---|---|---|
| 4,643,526 | 2/1987 | Watanabe et al. | 349/151 |
| 4,930,876 | 6/1990 | Suzuki et al. | 349/152 |
| 5,187,604 | 2/1993 | Taniguchi et al. | 349/152 |
| 5,510,918 | 4/1996 | Matsunaga et al. | 349/149 |
| 5,528,403 | 6/1996 | Kawaguchi et al. | 349/149 |

FOREIGN PATENT DOCUMENTS

| | | | |
|---|---|---|---|
| 2-127621 | 5/1990 | Japan | 349/150 |
| 3-12638 | 1/1991 | Japan | 349/149 |
| 4-177224 | 6/1992 | Japan | 349/151 |

*Primary Examiner*—William L. Sikes
*Assistant Examiner*—Toan Ton
*Attorney, Agent, or Firm*—Antonelli, Terry, Stout, & Kraus, LLP

[57] ABSTRACT

A liquid crystal display device is provided which reduces the resistance of input wires disposed between a flexible board and driving ICs mounted in a flip-chip style, and enhances resistance against electrocorrosion of input terminals thereof. The liquid crystal display device includes two transparent insulating substrates (SUB1, SUB2) confronting each other through a liquid crystal layer, plural liquid crystal driving circuits (ICs) mounted in a flip-chip style on a surface of one of the substrates located at the side of the liquid crystal layer, a flexible board (FPC) for inputting a signal to each of the liquid crystal driving circuits, and plural input wires (Td) provided on the surface of the one substrate at the side of the liquid crystal layer to connect output terminals of the flexible board to input terminals of the liquid crystal driving circuits. Each input wire includes a first metal layer (g1) in the vicinity of the surface of the substrate, a transparent conductive layer (d1) laminated on the first metal layer, connected to the input terminals of the flexible board, with open portions in the neighborhood of the input terminals of the liquid crystal driving circuits and in the neighborhood of the output terminals of the flexible board, a second metal layer (d2) laminated on the transparent conductive film and connected to the first metal layer at the open portions, and a protection film (PSV1) covering at least the second metal layer.

13 Claims, 22 Drawing Sheets

LCD DEVICE HAVING DRIVING CIRCUITS WITH MULTILAYER EXTERNAL TERMINALS

BACKGROUND OF THE INVENTION

1. Field of the Invention

The present invention relates to a liquid crystal display device in which liquid crystal driving ICs are mounted in a flip chip style on one of two transparent insulating substrates which are laminated on each other with a liquid crystal layer interposed therebetween.

2. Description of Related Art

An active matrix type of liquid crystal display device includes a liquid crystal layer, two transparent insulating substrates which are formed of glass or the like and disposed so as to confront each other through the liquid crystal layer, and a gate line group and a drain line group insulated from the gate line group, the gate line group and the drain line group being formed on the surface of one of the transparent substrates at the liquid crystal layer side. The gate line group comprises a number of gate lines which are formed on the surface of the substrate so as to be extended in an x-direction and juxtaposed with one another in a y-direction, and the drain line group comprises a number of drain lines which are formed on the surface of the substrate so as to be extended in the y-direction and juxtaposed with one another in the x-direction.

Each of areas which are surrounded by the gate line group and the drain line group serves as a pixel area, and a thin film transistor (TFT) and a transparent pixel electrode are formed as a switching element in each pixel area.

In the liquid crystal display device thus constructed, upon application of a scanning signal to a gate line, the corresponding thin film transistor is switched on, and a video signal is supplied from a drain line through the thin film transistor to the corresponding pixel electrode.

The drain lines and the gate lines are respectively extended to the periphery of the transparent insulating substrate to constitute external terminals, and a video driving IC circuit and a gate scan driving IC circuit which are connected to the external terminals are mounted on the periphery of the transparent substrate. As a mounting mode, plural tape carrier packages (TCP) each of which has each driving IC mounted thereon may be respectively attached to the periphery of the transparent insulating substrate from the external side, or both the video driving IC and the gate scan driving IC are directly mounted on the transparent insulating substrate in a flip-chip style with no TCP.

The connection method of the flip chip style as described above will be described with reference to FIGS. 16A and 16B.

As shown in FIG. 16A, a bump (projecting electrode) BUMP is formed on the lower surface of the driving IC, and the driving IC is held on the press surface of a bonding head HEAD by a vacuum suction method or the like. On a glass transparent insulating substrate SUB1 is formed a wiring pattern DTM for video signal lines (GTM for scanning signal lines) to be bonded to the bump BUMP. Further, the anisotropic conductive film ACF is attached beforehand onto the wiring pattern DTM.

Subsequently, an image pickup camera CAMERA is disposed at the lower side of the transparent insulating substrate SUB1 with its image pickup face FACE placed face up, and the transparent insulating substrate SUB1 is moved in X and Y directions in response to a signal from the image pickup camera CAMERA so that the bump BUMP and the wiring pattern DTM are positionally matched with each other (i.e., the positions of these elements are made coincident with each other). Thereafter, as shown in FIG. 16B the bonding head HEAD is moved downwardly to bring the bump BUMP of the driving IC into contact with the upper surface of the anisotropic conductive film ACF, and then these elements are temporarily attached (tacked) to each other. Thereafter, the image pickup camera CAMERA checks again whether the bump BUMP and the wiring pattern DTM are positionally matched. If the positioning is satisfactorily performed, the bump BUMP and the wiring pattern DTM are thermally fixed to each other under pressure by the bonding head HEAD.

In the above process, the conductive particles of the anisotropic conductive film ACF are squeezed between the bump BUMP and the wiring pattern DTM under the pressure of the bonding head HEAD as described above, whereby the bump BUMP and the wiring pattern DTM are electrically connected to each other.

As not shown in FIGS. 16A and 16B, a flexible substrate (FPC) which is to be electrically connected to an input wiring pattern of the driving IC and which supplies external signals to the driving IC is also subjected to the same bonding process, whereby a wiring pattern of the FPC (a copper pattern plated with gold, normally) and a wiring pattern (input wiring Td) on the transparent insulating substrate SUB1 can be electrically connected to each other with the anisotropic conductive ACF.

In order to promote densification of the liquid crystal display device and miniaturization of the liquid crystal display module, much attention has been recently paid to flip-chip style liquid crystal display devices.

SUMMARY OF THE INVENTION

In the conventional flip-chip style liquid crystal display devices, the terminals and wires on the transparent insulating substrate which are connected to the bump of the driving IC are formed of a transparent conductive film which is a monolayer, and thus they have large resistance.

To try to compensate for this, the input wiring of the driving IC can be formed by depositing Al film or Al alloy film on a transparent conductive film to reduce resistance to conductivity. However, the contact resistance between the transparent conductive film and the Al film or Al alloy film is large, and the overall resistance cannot be suppressed by such as mere deposition.

In addition, the Al film and the Al alloy film are liable to be polluted or oxidized, and thus these films are liable to suffer electrocorrosion (electrolytic corrosion). "Electrocorrosion" is defined as a phenomenon that metal terminals are electrolyzed (electrolytically decomposed) due to water containing impurities such as chlorine, etc. by an electric field applied across the metal terminals (input wires in this specification), so that the terminals are corroded. Following the recent development of the microstructural design of liquid crystal display devices, the pitch of the input wires to a driving IC tends to be further reduced. Therefore, water in the air is liable to adhere to the input wires, and thus the electrocorrosion problem becomes more critical to the extent that it is not negligible.

An object of the present invention is to provide a flip-chip style of liquid crystal display device which can reduce the resistance between a flexible substrate and a driving IC, and at the same time can enhance resistance-to-electrocorrosion of the input wires to the driving IC.

3

The foregoing and other objects, advantages, manner of operation and novel features of the present invention will be understood from the following detailed description when read in connection with the accompanying drawings.

DETAILED DESCRIPTION OF THE PREFERRED EMBODIMENT

Figure 1:
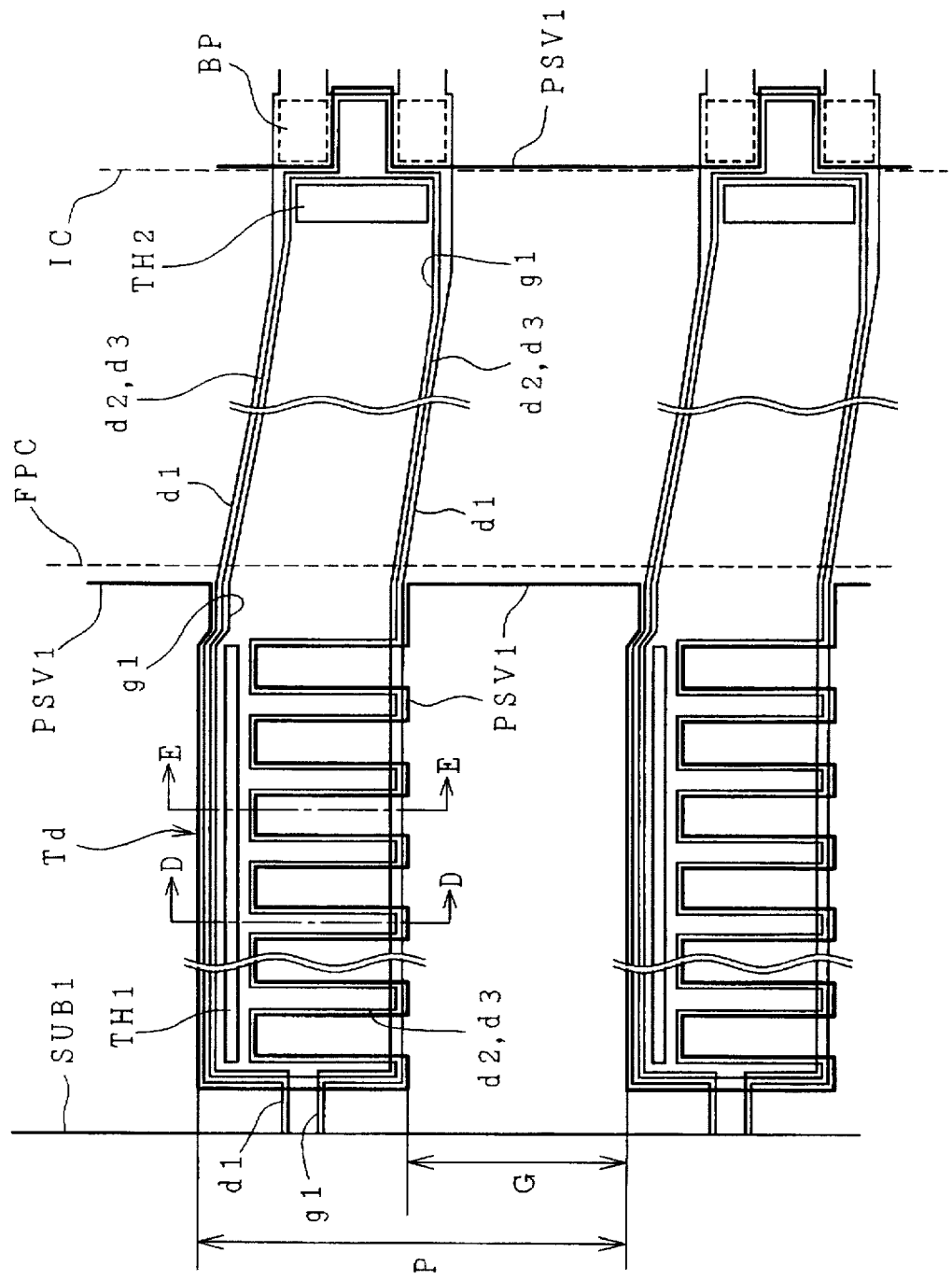
FIG. 1 is an enlarged plan view showing an input wire Td to a driving IC according to an embodiment 1 of the present invention.
Figure 4A:
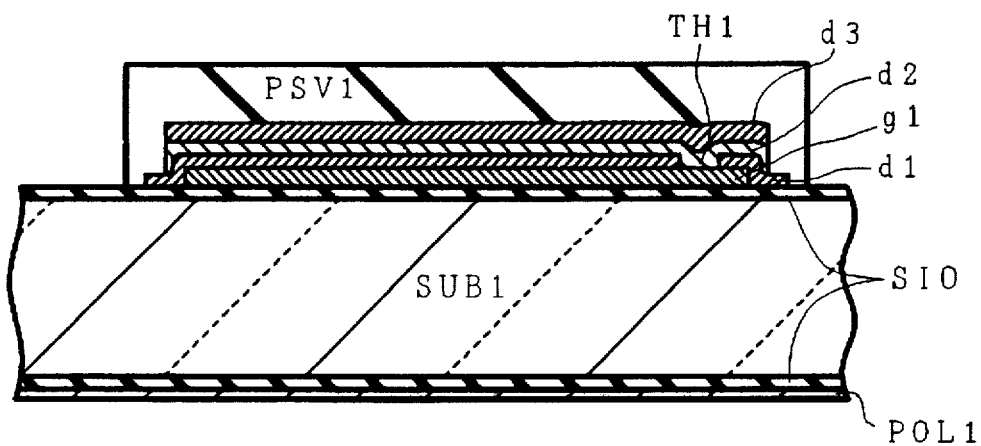
FIG. 4A is a cross-sectional view which is taken along a line D—D of FIG. 1.
Figure 4B:
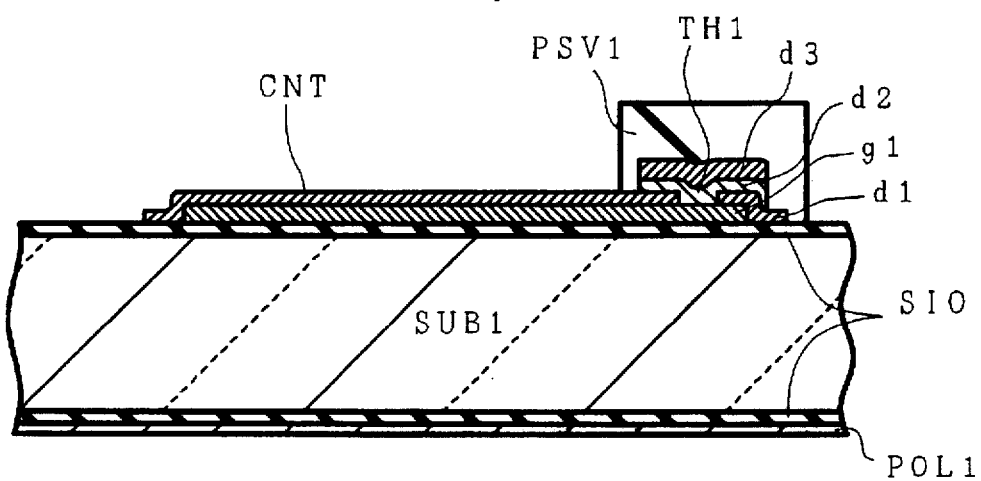
FIG. 4B is a cross-sectional view which is taken along a line E—E of FIG. 1.

FIG. 1 is an enlarged plan view of an input wire Td to a driving IC according to an embodiment 1 (an enlarged view of a B portion of FIG. 14), FIG. 4A is a cross-sectional view which is taken along a line D—D of FIG. 1, and FIG. 4B is a cross-sectional view which is taken along a line E—E of FIG. 1.

As shown in FIGS. 4A and 4B, the input wire Td to the driving IC comprises a first conductive film g1, an ITO conductive film d1, a second conductive film d2, a third conductive film d3 and a protection film (passivation film) PSV1.

The first conductive film g1 is formed of low-resistance metal such as Al—Ta, Al—Ti—Ta, Al—Pd or the like, and it is formed in the same process as gate electrodes/gate lines of the thin film transistors (TFTs) of the liquid crystal display device. The ITO conductive film d1 is formed of an ITO (indium tin oxide) film, and it is formed in the same process as a transparent pixel electrode of a display unit. The second conductive film d2 is formed of low-resistance metal such as Cr or the like, and it is formed in the same process as source/drain electrodes of the thin film transistor. The third conductive film d3 is formed of low-resistance metal such as Al—Pd, Al—Si, Al—Ta, Al—Ti—Ta or the like. The passivation film PSV1 is formed of SiN or the like to prevent electrocorrosion. As described above, the contact resistance between the transparent conductive film d1 and the first conductive film g1 is kept high due to the materials which are used. However, the contact resistance between the transparent conductive film d1 and the second conductive d2 and the contact resistance between the second conductive film d2 and the first conductive film g1 are low.

In FIG. 1, the driving IC is mounted at the right side of a broken line represented by reference character "IC". Reference character BP represents a bump connection portion to which a bump of the driving IC (see the bump BUMP of FIG. 15) is bonded. The bump connection portion BP is formed of a monolayer of the transparent conductive film d1 whose surface is exposed to the outside. Further, a flexible board (represented by reference character FPC of FIG. 15) for supplying signals and an external power source voltage for the driving IC is mounted at the left side of a broken line represented by reference character "FPC".

At a part of the input wire Td which is to be connected to the output terminals of the flexible board (at the left side of the broken line FPC), the second conductive film d2 and the third conductive film d3 are formed in a comb shape. In addition, the protection film PSV1 is also formed in a comb shape so as to correspond with the shape of the second and third conductive films d2 and d3, noting, however, that the conductive film d1 has a slightly larger size than these conductive films d2 and d3. That is, the transparent conductive film d1 is partially exposed to gaps between the teeth of the comb-shaped protection film PSV1 which is exposed to the outside as shown in FIGS. 1 and 4B, and the exposed portion of the transparent conductive film d1 and the output terminals of the flexible board are directly connected to each other.

As shown in FIG. 4 (the cross-sectional view which is taken along a line D—D of FIG. 1), the dimension of the width of each conductive film constituting the input wire Td is set so that the first conductive film serving as the lowermost layer of the input wire Td has the smallest width, each of the second and third conductive films d2 and d3 serving as upper layers has a larger width than the first conductive film g1, and the transparent conductive film d1 has the largest width.

The first conductive film g1 and the second conductive film d2 are connected to each other through through holes TH1 and TH2. Reference character P represents a terminal (input wire Td) pitch, and reference character G represents a terminal gap (interval).

In this embodiment, the input wire Td through which the flexible board and the driving IC are connected to each other is constructed by the first conductive film g1 and the second and third conductive films d2 and d3 as shown in FIGS. 4A and 4B, and the first conductive film g1 which has low resistance in a single state is connected to the second conductive film d2 through the through hole TH1. Accordingly, electrical signals from the output terminals of the flexible board are supplied from the exposed portion (CNT) of the transparent conductive film d1 through the second conductive film d2 into the first conductive film g1, and flow substantially through the first conductive film g1 from the position indicated by the broken line FPC to the position indicated by the broken line IC. The electrical signals flowing through the first conductive film g1 are supplied through the through hole TH2 into the second conductive film d2, and flow into the transparent conductive film d1 at the bump connection portion BP to which the bump of the driving IC is bonded.

With this construction, most of the electrical signals flowing from the output terminals of the flexible board to the bump portion of the driving IC flow through the first conductive film g1 formed of the low-resistance material, except for a short-distance portion from the exposed portion (CNT) of the transparent conductive film d1 to the second conductive film d2 in the neighborhood of the exposed portion (CNT). Therefore, the input wire Td can be designed to have low resistance, and thus the resistance between the flexible board and the driving IC can be reduced.

Further, the portion to be connected to the output terminals of the flexible board is formed of the transparent conductive film d1 which is chemically stable and thus suffers little electrocorrosion, and the second conductive film d2 and the third conductive film d3 which are chemically unstable and thus liable to suffer electrocorrosion are covered by the protection film; Thus, the present invention can satisfy a technical requirement for reducing the pitch of the input wire to the driving IC with no problem.

As described above, the second and third conductive films d2 and d3 are formed in a comb shape. This comb-shape structure mechanically stabilizes the connection between the transparent conductive film d1 and the output terminals of the flexible board in the gaps of the teeth of the comb-shaped structure, and in addition it keeps the connection distance from any position of the exposed portion (CNT) of the transparent conductive film d1 to the second conductive film d2 from being large, so that the resistance can be reduced as a whole. As the a simple modification of this embodiment (see FIG. 5), rather than designing the second conductive film d2 and the third conductive film d3 in a comb shape, can be designed instead in such an electrode structure that they have the cross section as shown in FIG. 4B over the whole area thereof. In this case, the contact portion between the terminals of the flexible board and the exposed portion (CNT) of the transparent conductive film d1 has a large area, and thus the contact resistance is lowest. However, the suitably-formed comb-shaped electrode structure has an effect of reducing the overall resistance by a larger amount than an increase of the resistance due to reduction of the contact area.

Further, the second and third conductive films d2 and d3 located at the portion of the input wire Td to be connected to the output terminals of the flexible board are formed in a comb shape except for a part thereof, whereby the transparent conductive film d1 is partially exposed through the gaps between the teeth of the comb shape. Therefore, this embodiment is convenient to check the quality of driving ICs.

Figure 2:
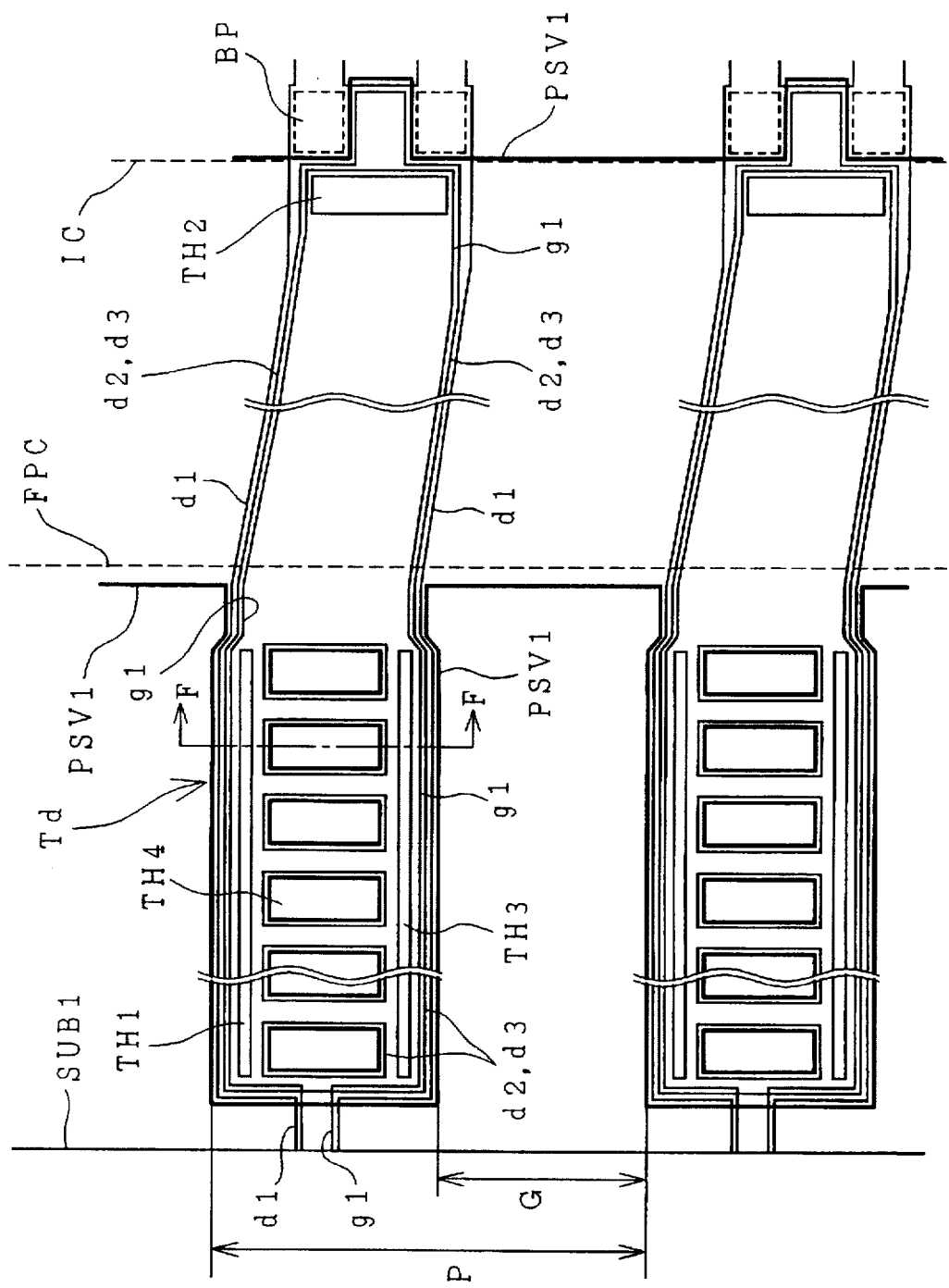
FIG. 2 is an enlarged plan view showing an input wire Td to a driving IC according to an embodiment 2 of the present invention.
Figure 4C:
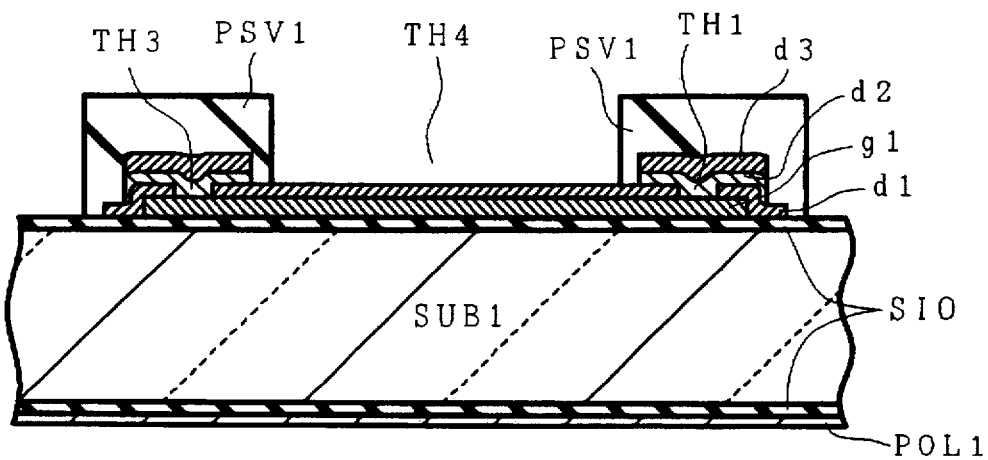
FIG. 4C is a cross-sectional view which is taken along a line F—F of FIG. 3.

FIG. 2 is an enlarged plan view showing an input wire Td to a driving IC according to an embodiment 2 of the present invention, and FIG. 4C is a cross-sectional view which is taken along a line F—F of FIG. 2.

The construction of this embodiment is basically identical to that of the embodiment 1. The different points between the embodiments 1 and 2 are as follows.

In the embodiment 1, the second and third conductive films d2 and d3 are designed in a comb shape while in the embodiment 2 the second and third conductive embodiments d2 and d3 are designed in a ladder shape to form rectangular portions TH4 as shown in FIG. 2. Further, the embodiment 1 is provided with only two through holes TH1 and TH2 through which the first and second conductive films g1 and d2 are connected to each other while the embodiment is further provided with a through hole TH3 in addition to the through holes TH1 and TH2.

With this construction, the same effect as the embodiment 1 can be obtained, and further the effect of the reducing the resistance is larger than the embodiment 1 because the area ratio of the second and third conductive films d2 and d3 of low-resistance metal and the contact area between the first and second conductive films g1 and d2 are large.

According to this embodiment, the second and third conductive films d2 and d3 are designed in a ladder shape, two support portions of the "ladder" are allocated to each terminal, and the second and third conductive films d2 and d3 having large area are adjacent for the neighboring terminals (input wire Td). On the other hand, according to the embodiment 1, the second and third conductive films d2 and d3 are designed in a comb shape, and one support portion of the "comb" is allocated to each terminal. Accordingly, the embodiment 2 has a higher probability that the second and third conductive films d2 and d3 are exposed to the outside due to the damage of the protection film, and thus the embodiment 1 provides higher resistance to electrocorrosion.

Figure 3:
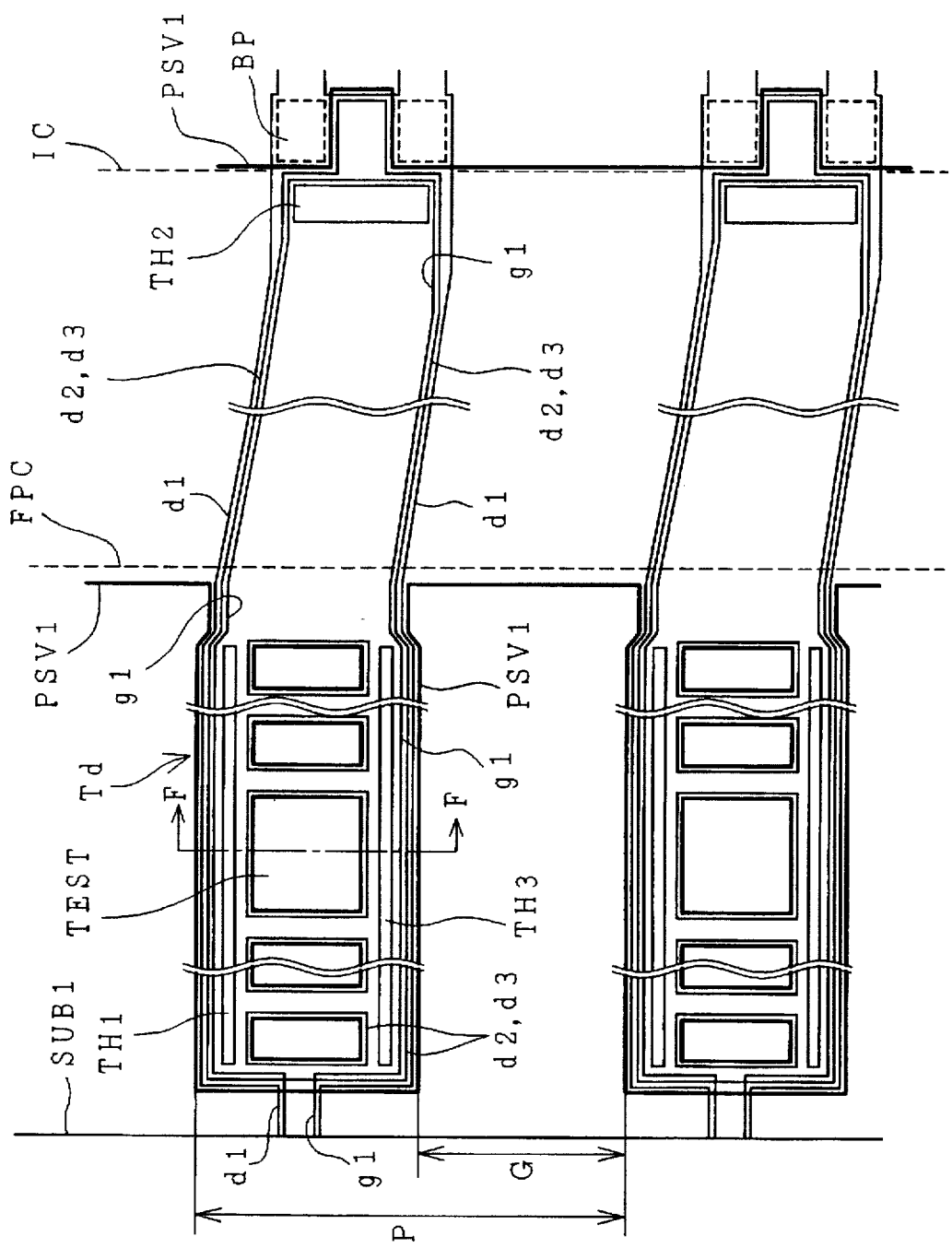
FIG. 3 is an enlarged plan view showing an input wire Td to a driving IC according to an embodiment 3 of the present invention.

FIG. 3 is an enlarged plan view showing an input wire Td to a driving IC according to an embodiment 3. The construction of the embodiment 3 is basically identical to that of the embodiment 2 shown in FIG. 2. Reference character TEST represents a turn-on test pad. In this embodiment, one of gaps (window portions) between the lattices of the ladder-shaped portion is set to have a larger interval (width) than the other gaps (window portions) as shown in FIG. 3 (in this embodiment, the gap at the middle portion is set to be larger) to increase the area of a portion of the transparent conductive film d1 which is exposed through the broadened window portion, and this broadened window portion is used as the turn-on test pad TEST to facilitate the test. The other constructions, action and effects are identical to those of the embodiment 2 shown in FIG. 2.

The present invention is not limited to the above embodiments, and various modifications may be made without departing from the subject matter of the present invention. For example, the structure of the input wire Td (i.e., the terminals) of the embodiments 1 to 3 is may be applied to some parts of the terminals. For example, it may be applied to terminals which are liable to suffer electrocorrosion, that is, neighboring terminals across which a high potential difference is applied, terminals to which DC potential is applied, terminals to which low alternating potential having a frequency of 90 Hz or less is applied or the like.

Further, the shape of the second and third conductive films d2 and d3 is not limited to the comb shape of the embodiment 1 shown in FIG. 1 or the ladder shape of the embodiments 2 and 3 shown in FIGS. 2 and 3, and other shapes may be used. The same effect as described above can be obtained by coating the transparent conductive film d1, except for a part thereof, with the second and third conductive films d2 and d3.

Still further, the present invention is limited to the materials of the first conductive film g1 and the second and third conductive films d2 and d3 as described above, and the second and third conductive films d2 and d3 may be constructed by only one layer. Also, the first conductive film g1 may be eliminated.

Still further, the above embodiments are applied to an active matrix type liquid crystal display device using a thin film transistor as a switching element, etc., however, it is needless to say that the present invention is applicable to a simple matrix type liquid crystal display device as well.

Figure 5:
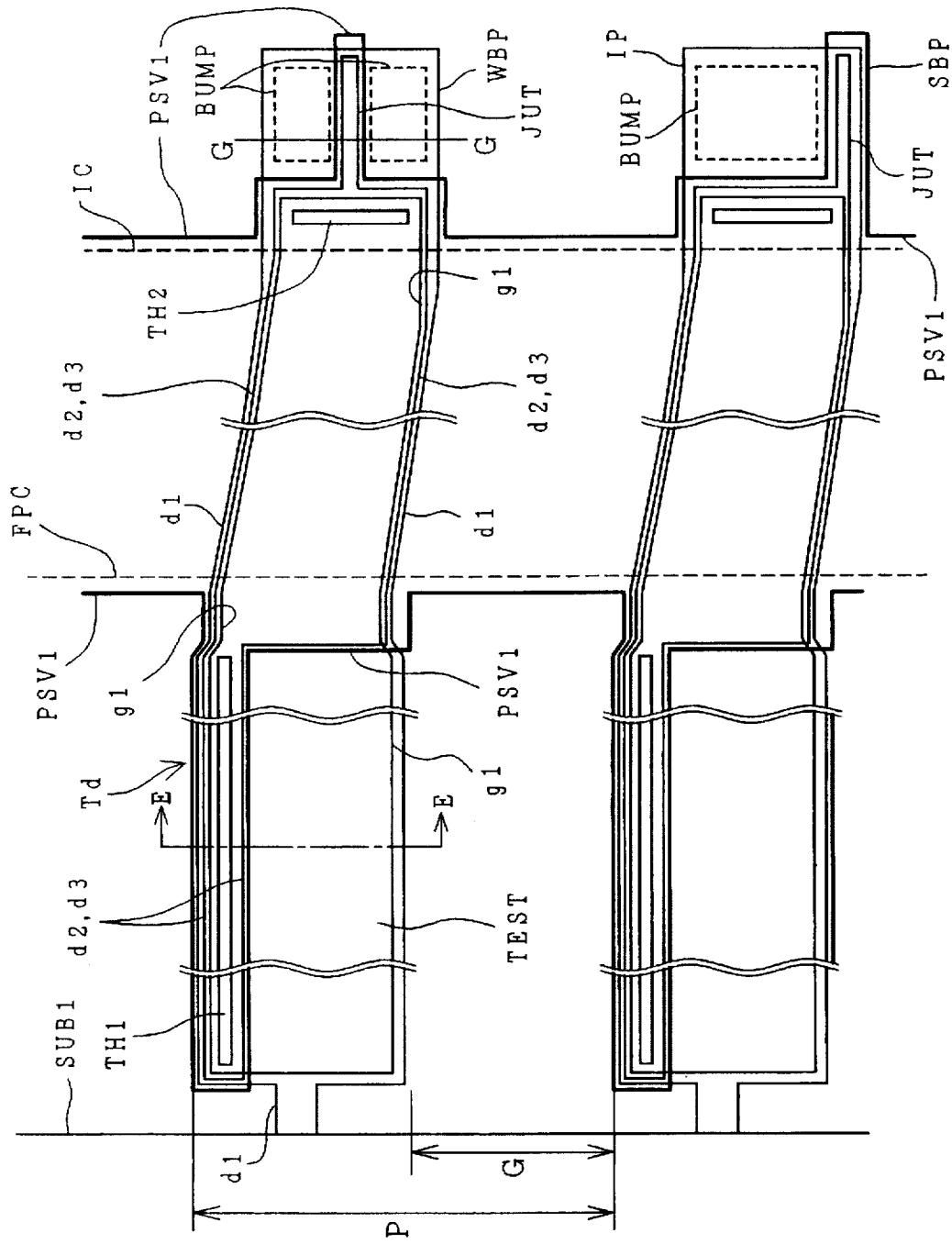
FIG. 5 is an enlarged plan view showing an input wire Td to a driving IC according to an embodiment 4 of the present invention.

FIG. 5 is an enlarged plan view showing an input wire Td to a driving IC according to an embodiment 4 of the present invention.

As rated in the description of embodiment 1, embodiment 4 is a simplified modification of the present invention, and the construction of this embodiment is basically identical to that of the embodiments as described above.

Reference character BUMP represents a bump connection portion to which the bump BUMP of the driving IC is bonded. In FIG. 5, in order to make understandable various modifications of an input terminal (IP) containing a bump portion, various types of input wires having different structures are illustrated as if they are arranged adjacently to each other.

Reference character P represents the pitch (about 0.4 to 1.3 mm) of terminals (input wires Td), and reference character G represents a terminal gap (interval) (about 0.2 to 1.1 mm).

In the terminal structure as shown in FIG. 5, the resistance value of the input wire Td from the connection portion with the flexible board to the input terminal IP is as follows. For example, assuming that the wire width is equal to 300 μm and the wire distance is equal to 2 mm, resistivity is equal to about 0.21Ω/□ for Al—Pd when the thickness of the wire layer d3 is set to about 4000 Å, and to about 0.5Ω/□ for Al—Ta—Ti when the thickness of the wire layer g1 is set to about 2800 Å. Therefore, they serve as parallel connection resistors of 0.67Ω and 3.3Ω, and even in consideration of the through hole resistance of TH1 and TH2 between the input wire Td and the transparent conductive film d1, the resistance value is equal to several ohms as a whole. These measurement values are substantially equal to those of the embodiments 1 to 3.

The structure of the input terminal IP as described above will be described with reference to FIGS. 6A, 6B, 6C, 7A, 7B, 7C, 7D, 8A, 8B and 8C.

As described above, the resistance value from the connection portion of the input wire Td with the flexible board to the input terminal Ip is equal to several ohms. Further, the input terminal IP portion itself is required to have a resistance value of several ohms.

Figure 6A:
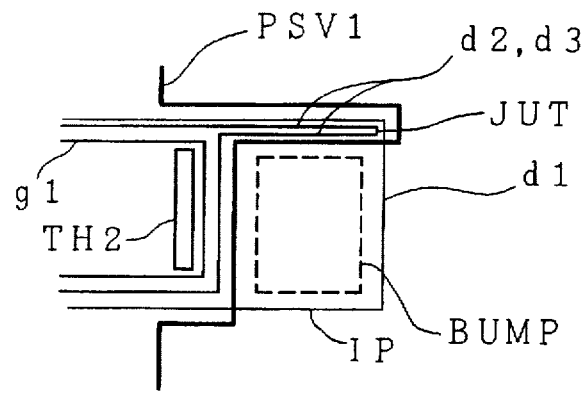
FIGS. 6A, 6B and 6C are diagrams showing arrangements of an input terminal and a single bump which is a connection portion for driving.
Figure 6B:
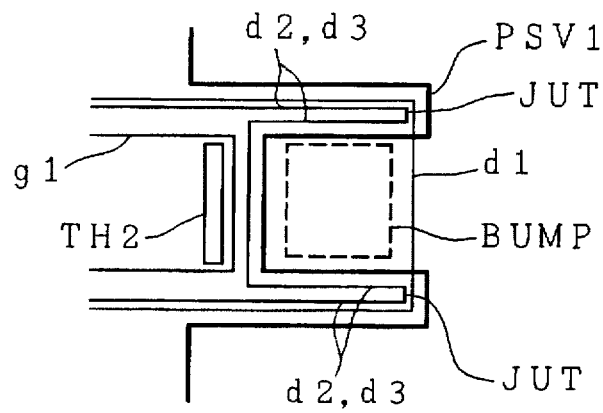
Figure 6C:
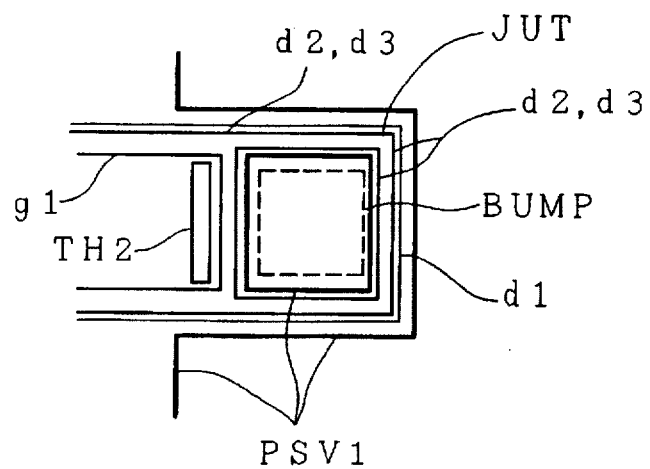

FIGS. 6A, 6B and 6C are enlarged plan views showing the relative position (arrangement) between the input terminal IP and the bump of the driving IC according to this embodiment. The structure of this embodiment is referred to as "single bump SBP" because the bump is not divided into plural parts.

For the same-size input terminal IP, the following arrangements may be adopted. That is, a first arrangement is that a projecting portion JUT of wire layers d2 and d3 formed around the bump is provided at one side of the bump in FIG. 6A, a second arrangement is that the projection JUT is provided at two sides of the bump in FIG. 6B and a third arrangement is that the projecting portion JUT is provided at three sides of the bump in FIG. 6C. The projecting portion JUT (wire layer d3) as described above is mainly formed of aluminum, and thus a projection film PSV1 is coated on the wire layer d3 to prevent the projection portion JUT from being damaged and to enhance reliability in terms of resistance to electrocorrosion. The contact area between the transparent conductive film and the bump is largest in the structure shown in FIG. 6A, and smallest in the structure shown in FIG. 6C.

For example, in the case where the width of the input terminal IP is set to about 100 μm and the connection area is required to be 70 μm square or more to achieve a high reliability connection, the wire width of the projecting portion JUT of the wire layers d2 and d3 is set to about 10 to 20 μm, and thus the structure shown in FIG. 6A is optimum. Further, this structure is flexible to the positional displacement of the bump in the longitudinal direction of the input terminal IP, and thus the projecting portion JUT is not broken. However, in order to reduce the wire resistance value Rt, the structure shown in FIG. 6B or FIG. 6C is more preferable.

The projecting portion JUT is formed by extending the wire layers d2 and d3, however, the wire layer g1 having the same shape may be formed below the transparent conductive layer d1 to reduce the resistance.

FIGS. 7A, 7B, 7C and 7D are enlarged plan views showing the relative position (arrangement) of the input terminal IP and divided bumps of the driving IC according to another embodiment. The structure of this embodiment is referred to as "double bump structure (WBP)" because the bump is divided into plural parts.

For the same-size input terminal IP, the following four arrangements may be adopted. A first arrangement is that the projecting portion JUT is provided at the gap between the divided bumps as shown in FIG. 7A, a second arrangement is that the projecting portion JUT is provided at the gap between the divided bumps and at one side of the divided bumps as shown in FIG. 7B, a third arrangement is that the projecting portion JUT is provided at the gap between the divided bumps and at two sides of the divided bumps as shown in FIG. 7C, and a fourth arrangement is that the projecting portion JUT is provided at the gap between the divided bumps and at three sides of the divided bumps as shown in FIG. 7D.

Figure 7A:
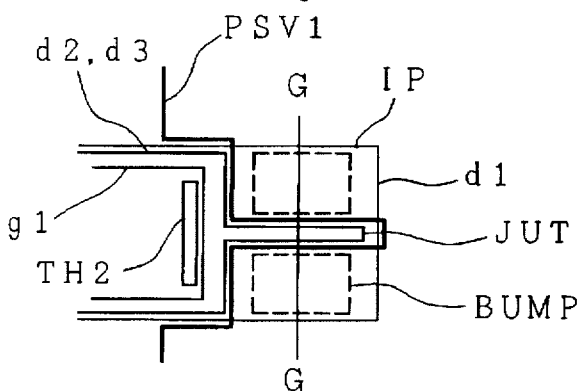
FIGS. 7A, 7B, 7C and 7D are diagrams showing arrangements of an input terminal and a double bump which is a connection portion for driving.
Figure 7B:
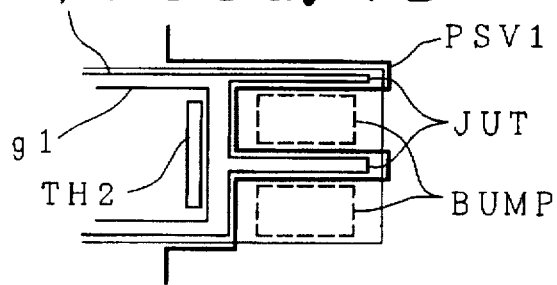
Figure 7C:
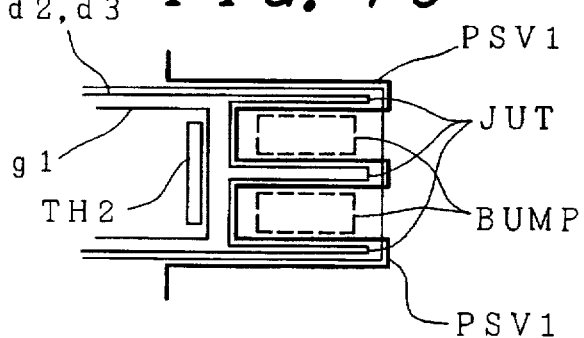
Figure 7D:
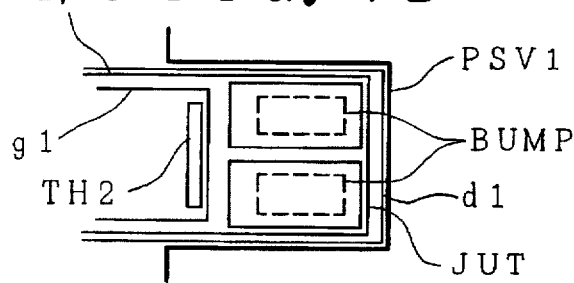

In the case where the width of the input terminal IP is set to about 100 μm and the connection area between the transparent conductive film and the bumps is required to be 70 μm square or more, the wire width of the projecting portion JUT is set to about 10 to 20 μm, and thus the structure shown in FIG. 7A is optimum. Further, this structure is flexible to the positional displacement of the bump in the longitudinal direction of the input terminal IP, and thus the projecting portion JUT is not broken. However, the wire structure as shown in FIG. 7B or the like is suitably used in which the width of the input terminal IP is larger than as described above or the wire resistance value can be reduced in accordance with the required connection area of the transparent conductive film and the bumps.

Figure 8A:
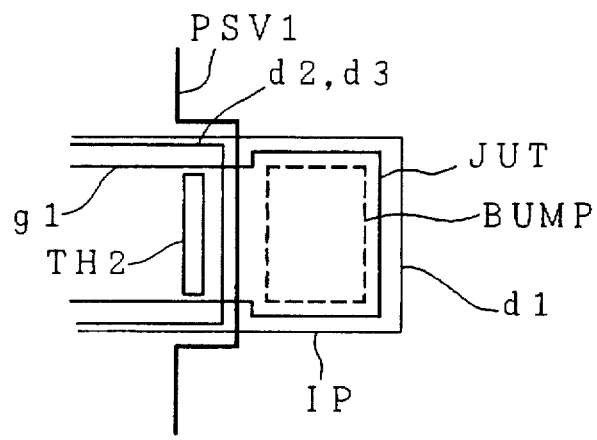
FIGS. 8A, 8B and 8C are diagrams showing arrangements of an input terminal and a double bump which is a connection portion for driving.
Figure 8B:
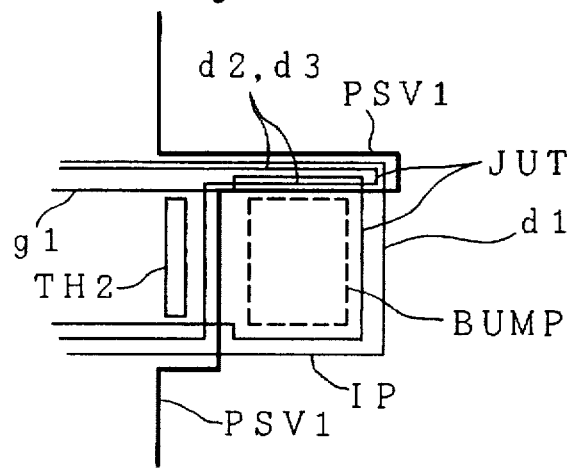
Figure 8C:
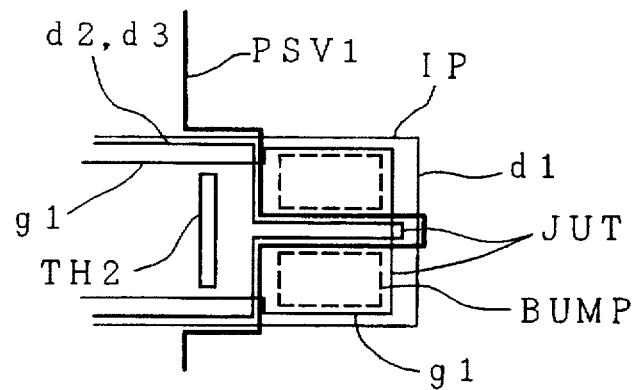

FIGS. 8A, 8B and 8C are diagrams showing another embodiment of the input terminal IP as described above. The different point from the wire structure of the input terminal IP as described resides in that a metal layer to form a gate wire is used as a wire of a low-resistance metal layer.

In FIG. 8A, in the input terminal portion IP, a projecting portion JUT which is formed of a metal layer g1 to form a gate wire is provided below the transparent conductive film d1 which is provided to the connection portion BUMP with the bump. However, in this case, the transparent conductive film d1 and the metal layer g1 have high contact resistance, and thus this structure has a small effect on the reduction of the resistance.

FIG. 8B is a diagram showing a modification of the input terminal IP structure shown in FIG. 6A, and FIG. 8C is a diagram showing a modification of the input terminal IP structure shown in FIG. 7A. The modifications differ from the wire structures shown in FIGS. 6A and 7A in that the projecting portion JUT is formed of the metal layer g1 to form the gate wire.

Figure 9:
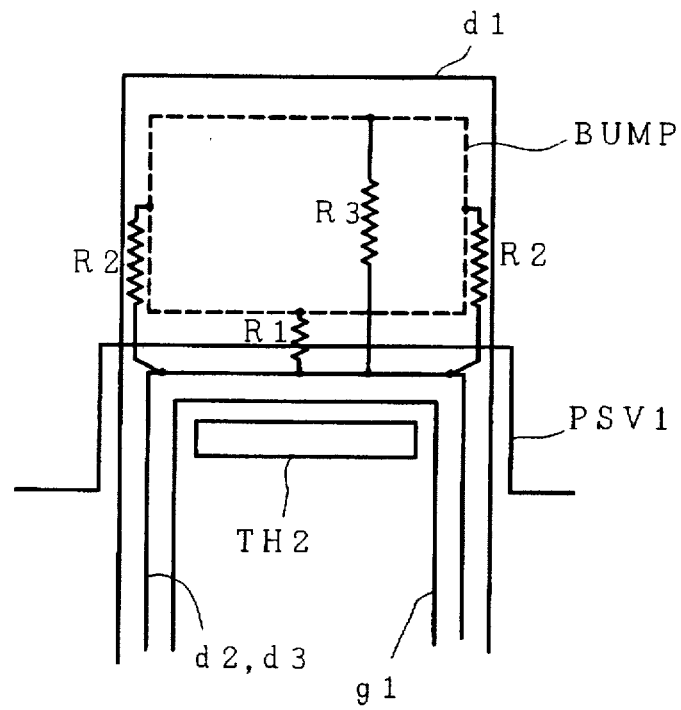
FIG. 9 is a schematic diagram showing an input terminal structure and resistance values to the bump when no protecting portion JUT is provided.
Figure 10:
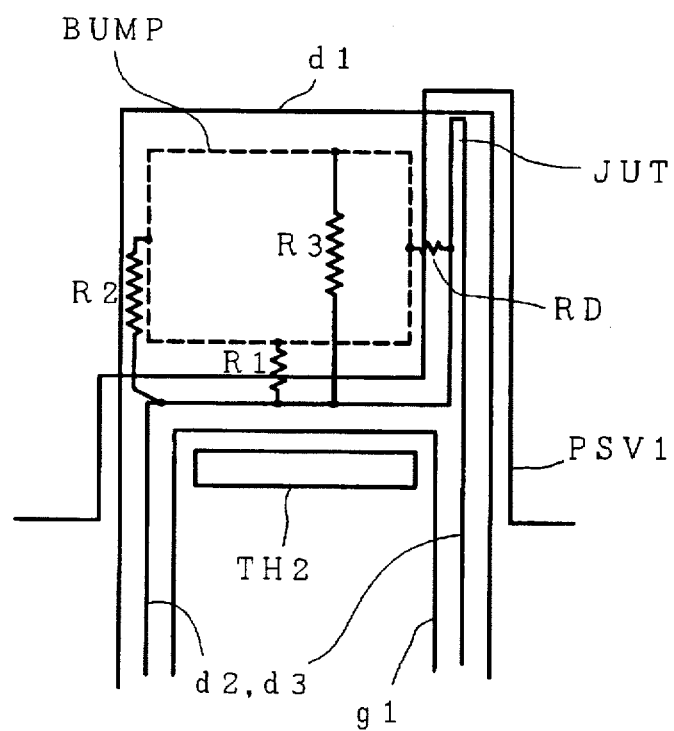
FIGS. 10 and 11 are schematic diagrams showing input terminal structures SBP, WBP which are similar to the input terminal structure shown in FIGS. 6A and 7A and resistance values to the bump.
Figure 11:
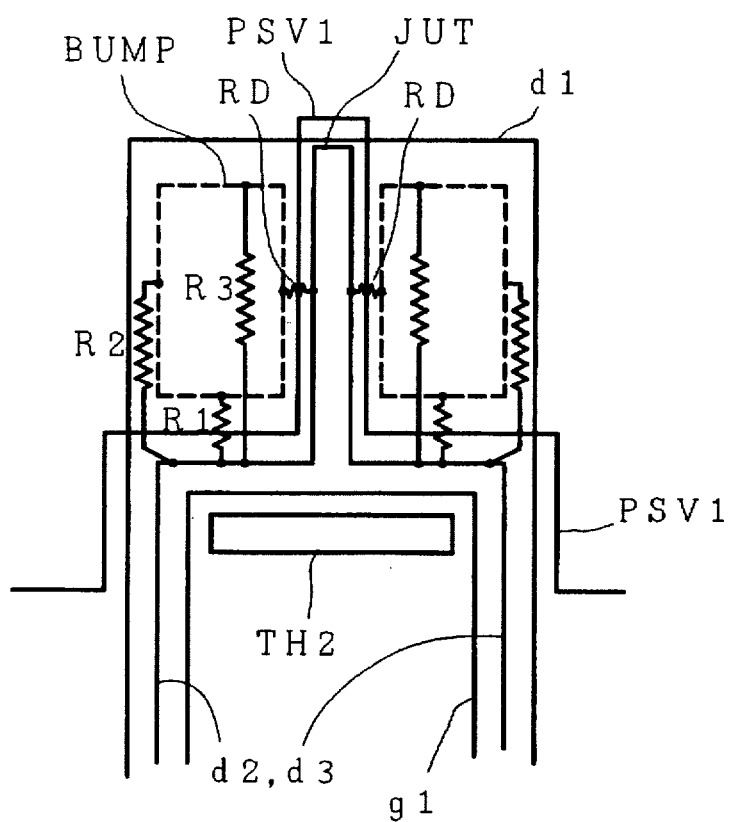

FIG. 9 is a schematic diagram showing the input terminal structure when no projecting portion is provided, and the resistance value to the bump. FIGS. 10 and 11 are schematic diagrams showing input terminal structures SBP and WSP similar to those of FIGS. 6A and 7A, and the resistance values thereof to the bump. The structure shown in FIG. 9 is identical to the conventional structure except for a connection portion using a through hole TH2. With respect to the resistance between the connection portion with the bump BUMP and the wire layers d2, d3, the structure shown in FIG. 9 may be treated as the conventional structure, and in some parts of the following description, the structure shown in FIG. 9 is treated as the conventional structure.

The following assumption is established to simulate the resistance values based on the application of the prior art and the present invention under the substantially same condition except for the input terminal structure.

In FIGS. 9, 10 and 11, the portion which is surrounded by a dotted line corresponds to the connection portion (BUMP) with the driving IC. It is assumed that the width of the bump BUMP is equal to 70 μm, the distance between the wire layer d2, d3 and the bump BUMP is equal to 40 μm and the resistance value therebetween is equal to R1. Further, it is also assumed that the thickness of the wire layer d1 formed of the ITO film is equal to about 1400 Å and the resistivity thereof is equal to about 20Ω/□, and thus R1 is set to about 11.4Ω. Resistance values R2, R3 and R4 are larger than R1, and the total parallel resistance value (R2+R3+R4) of the connection portion with the bump (BUMP) and the ends of the wire layers d2, d3 is substantially equal to the resistance value R1 (experimentally the parallel resistance value is equal to about 10Ω).

It was found that the resistance value R1 varied from 5 to 17Ω due to the positional displacement between the bump BUMP and the connection portion if the distance as described above is dispersed in the range of 20 to 60 μm every bump. Accordingly, in the conventional input terminal structure, it has been difficult to minimize the dispersion of the total resistance value Rt of the connection resistance RA between the wire layers d2, d3 at the bump side and the bump BUMP, the connection resistance value RA between the wire layers d2, d3 at the flexible board side and the flexible board, and the resistance value Radd of the input wire Td from the wire layers d2, d3 at the bump side to the wire layers d2, d3 at the flexible board side, and set the absolute value of the total resistance value Rt to 15Ω or less as a target value.

On the other hand, in the electrode structure shown in FIG. 10, since the projecting portion JUT is formed, a low-resistance portion (resistor RD) is formed at a part of the resistor R2 shown in FIG. 9 because the wire distance is shortened. The resistance of the resistor RD is equal to about 11.4Ω if the width of the resistor RD portion at the bump side is equal to 70 μm, the distance between the wire layers d2, d3 and the bump BUMP is equal to 40 μm and the resistivity of the wire layer d1 is equal to about 20Ω/□. That is, the resistors R1 and RD mainly form the parallel resistance, and thus the connection resistance value RA is reduced to a half value of that of the conventional structure. Accordingly, the connection resistance RA is reduced to about 6Ω or less.

Further, in the double WBP structure shown in FIG. 11, the projecting portion JUT is formed at the center portion between the divided bumps, and the resistor RD is formed at each of both sides of the projecting portion JUT located at the center portion. These resistors RD are connected to the resistor R1 in parallel, so that the input wire has lower resistance than that shown in FIG. 10.

For example, assuming that the width of the resistor RD portion at the bump side is equal to 70 μm, the distance between the wire layers d2, d3 and the bump BUMP is equal to 40 μm and the resistivity of the wire layer d1 is equal to about 20Ω/□, the resistance RD is equal to about 11.4Ω. That is, the resistors of R1/2 and RD/2 form the parallel resistance every each of the divided bump, and thus the connection resistance can be reduced to about one-fourth of that of the conventional structure. Specifically, the connection resistance RA of this embodiment is equal to about 3Ω or less. It is needless to say that the resistance of the input terminal can be further reduced by allowing a larger number of sides of the bump by the projecting portion JUT.

Figure 12:
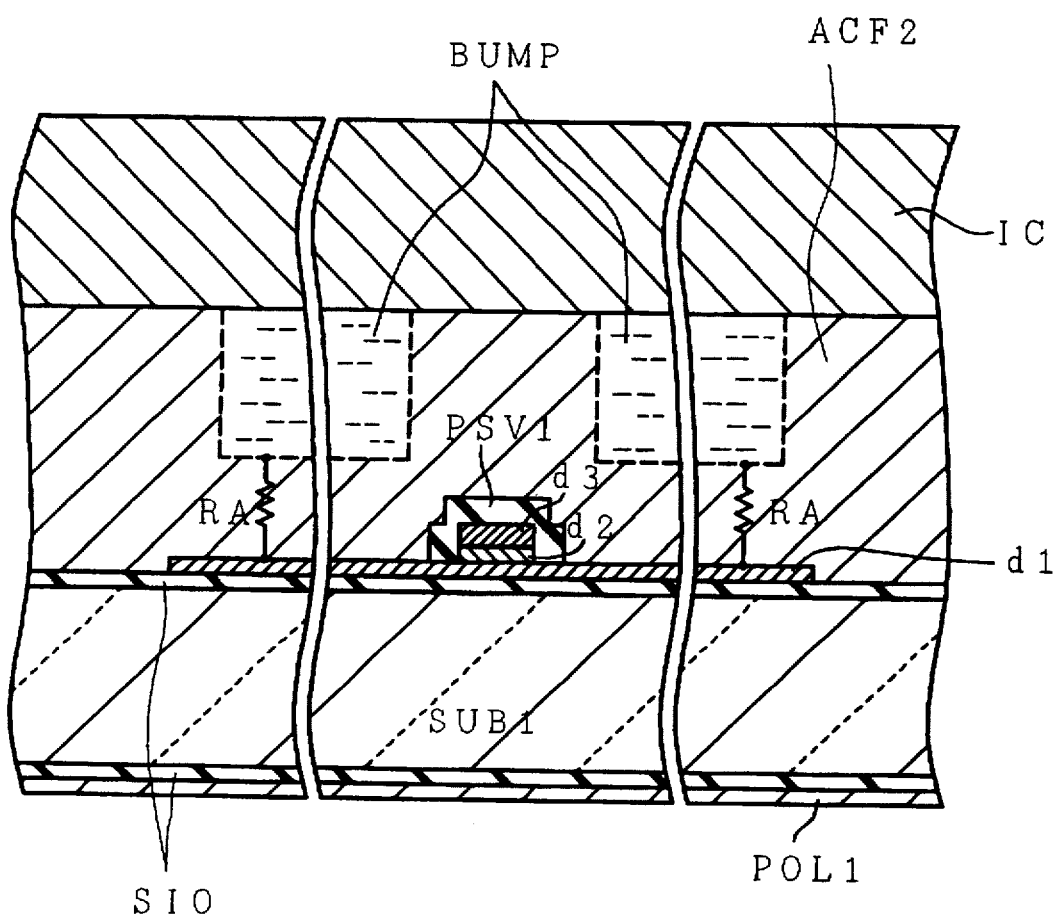
FIG. 12 is a schematic cross-sectional view which is taken along a line G—G, showing the double bump WBP structure shown in FIGS. 5 and 7A after a driving IC is mounted.

FIG. 12 is a schematic cross-sectional view showing the double bump WBP structure shown in FIGS. 5 and 7 after the driving IC is mounted, which is taken along a line G—G.

In this embodiment, the bump BUMP of the driving IC is formed of gold (Au). As the anisotropic conductive film ACF2 is used material placed on the market which is formed by plating nickel (Ni) and gold (Au) on plastic particles each having about 5 μm diameter and has a particle density of 10,000 particles/mm$^2$ or more. In the thermal press process, the driving IC side is heated at 150° C. or more and pressed to electrically connect the bump BUMP to the transparent conductive film d1 on the transparent insulating board. As a result, the connection resistance value RA between the bump BUMP and the transparent conductive film d1 is equal to several ohms when the total connection area is equal to 40 μm square or more.

As described above, according to the present invention, the connection resistance value RA can be reduced to a half of that of the conventional structure, and the input terminal IP which has high reliability and is suitable for high-density bump mounting can be designed.

Figure 13A:
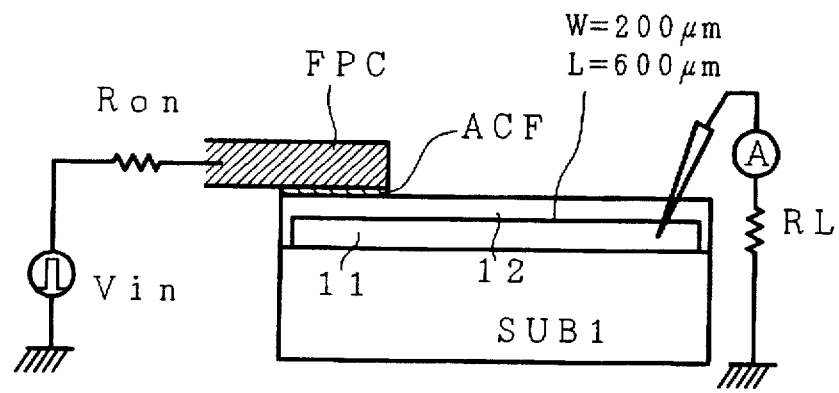
FIG. 13A is a diagram showing a measurement method when a wire of a low resistant metal layer is formed on the lower layer or upper layer of a transparent conductive film.
Figure 13B:
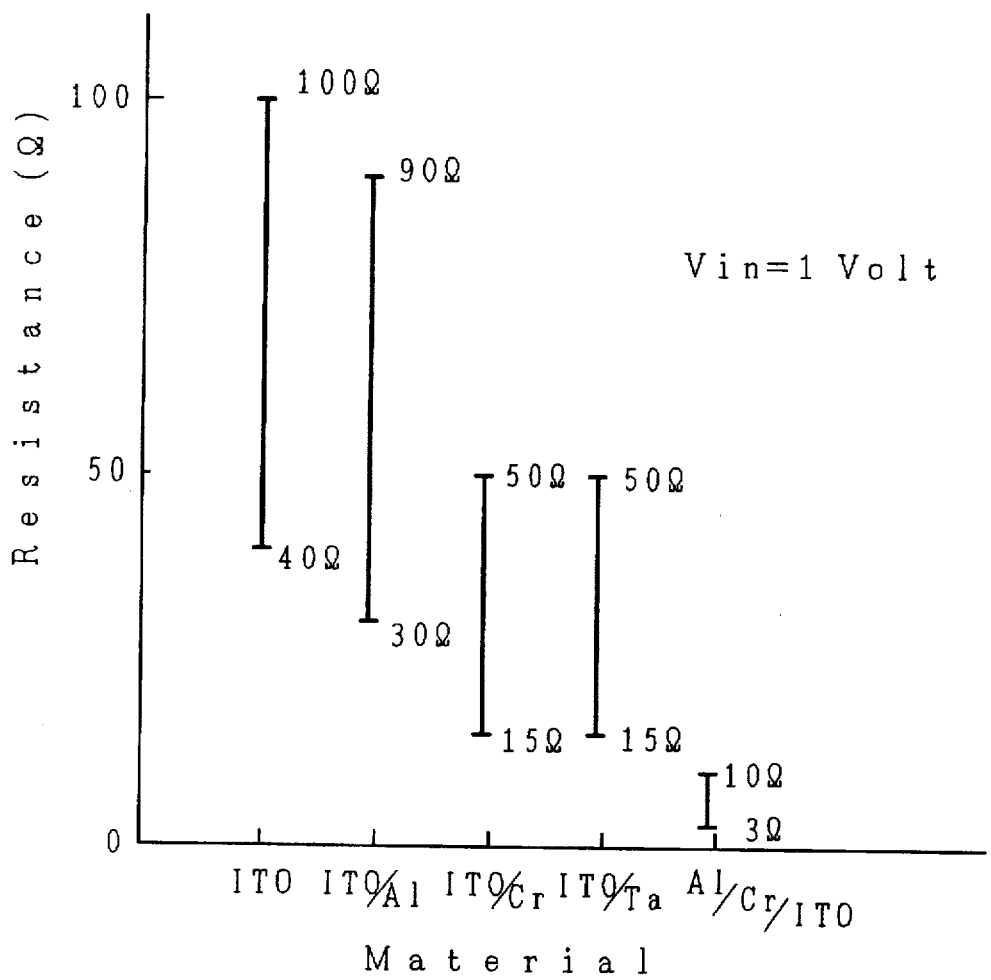
FIG. 13B is a graph showing the relationship between various materials and their resistance values, in which the abscissa axis represent various materials and the ordinate axis represent the measurement results of the respective materials.

FIG. 13A is a diagram showing a measuring method when the wire of a low-resistance metal layer is formed below or above the transparent conductive film, and FIG. 13B is a graph in which the abscissa axis represents various materials used for the low-resistance metal layer and the ordinate axis represents a measurement result of each material.

As shown in FIG. 13A, a measurement terminal pattern is designed in a multilayer structure containing the transparent conductive film ITO, and the connection area between a lower layer 11 and an upper layer 12 is set to 200 μm in width and 600 μm in length. The flexible board FPC is electrically connected to the upper layer 12 through the anisotropic conductive film ACF at a connection distance of 100 μm, and a voltage of about 1 V is applied through a resistor Ron. The current value is measured by attaching a test probe to the end of the measurement terminal pattern, and the resistance value at that time is calculated.

FIG. 13B shows the measurement result. For the monolayer transparent conductive film ITO, the resistance value between terminals (hereinafter referred to as "inter-terminal resistance value") is equal to about 40 to 100Ω. That is, the resistance value is high and its dispersion is also high. This is because its specific resistance is high (equal to about 20Ω/□) and it is greatly effected by variation of the thickness. From the above viewpoint, it is proved that the monolayer structure of the transparent conductive film ITO is not suitable for the input terminal.

On the other hand, in the structure that the low-resistance metal layer is wired below the transparent conductive ITO, it is found that the connection resistance varies in accordance with the material of the lower layer 11, and the resistance value between the terminals also varies. That is, in such a ITO/Al structure that a transparent conductive film ITO is formed as the upper layer 12 and a film containing mainly aluminum is formed as the lower layer 11, the inter-terminal resistance value is reduced to about 10Ω. Therefore, the connection resistance between the two layers is very high.

This is because a thin oxide film is formed on the surface of the film which is mainly formed of aluminum. In such an ITO/Cr or ITO/Ta structure in which a film which is mainly formed of chromium (Cr) or tantalum (Ta) is formed as the lower layer 11, the inter-terminal resistance value is reduced to about a half, and the connection resistance between the two layers is very low. In such an Al/Cr/ITO structure in which the upper layer 12 comprises two layers of aluminum (Al) and chromium (Cr) and the lower layer 11 is formed of the transparent conductive film ITO, there is little connection resistance between the two layers.

As is apparent from the foregoing, the resistance of the input terminal portion can be further reduced as compared with the case of using the monolayer transparent conductive film by using a metal layer forming a gate wire as a wire of a low-resistance metal layer and designing the input terminal IP so that the wire of the low-resistance metal layer is projected below the transparent conductive film.

Figure 14:
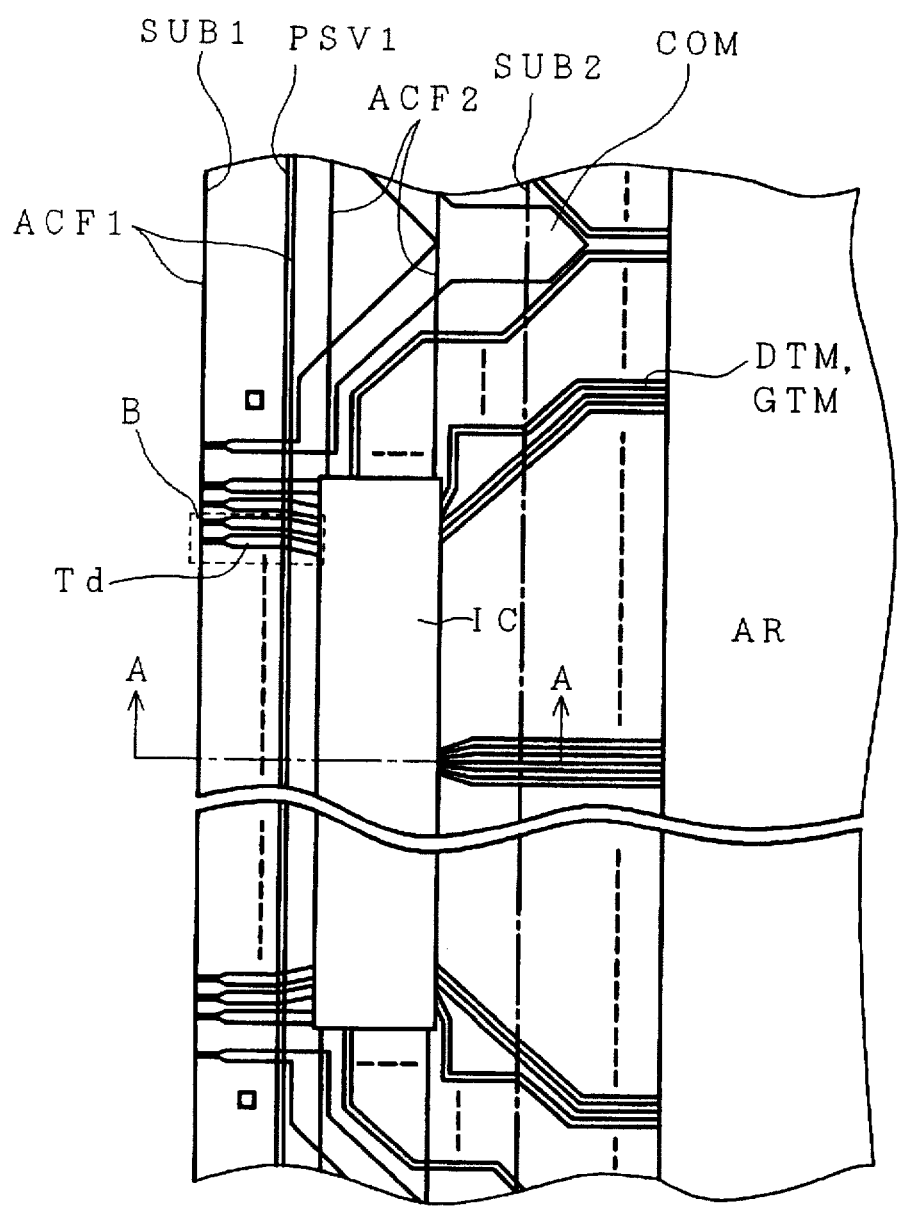
FIG. 14 is a plan view showing a driving IC mounted on a transparent insulating substrate SUB1 formed of glass.
Figure 15:
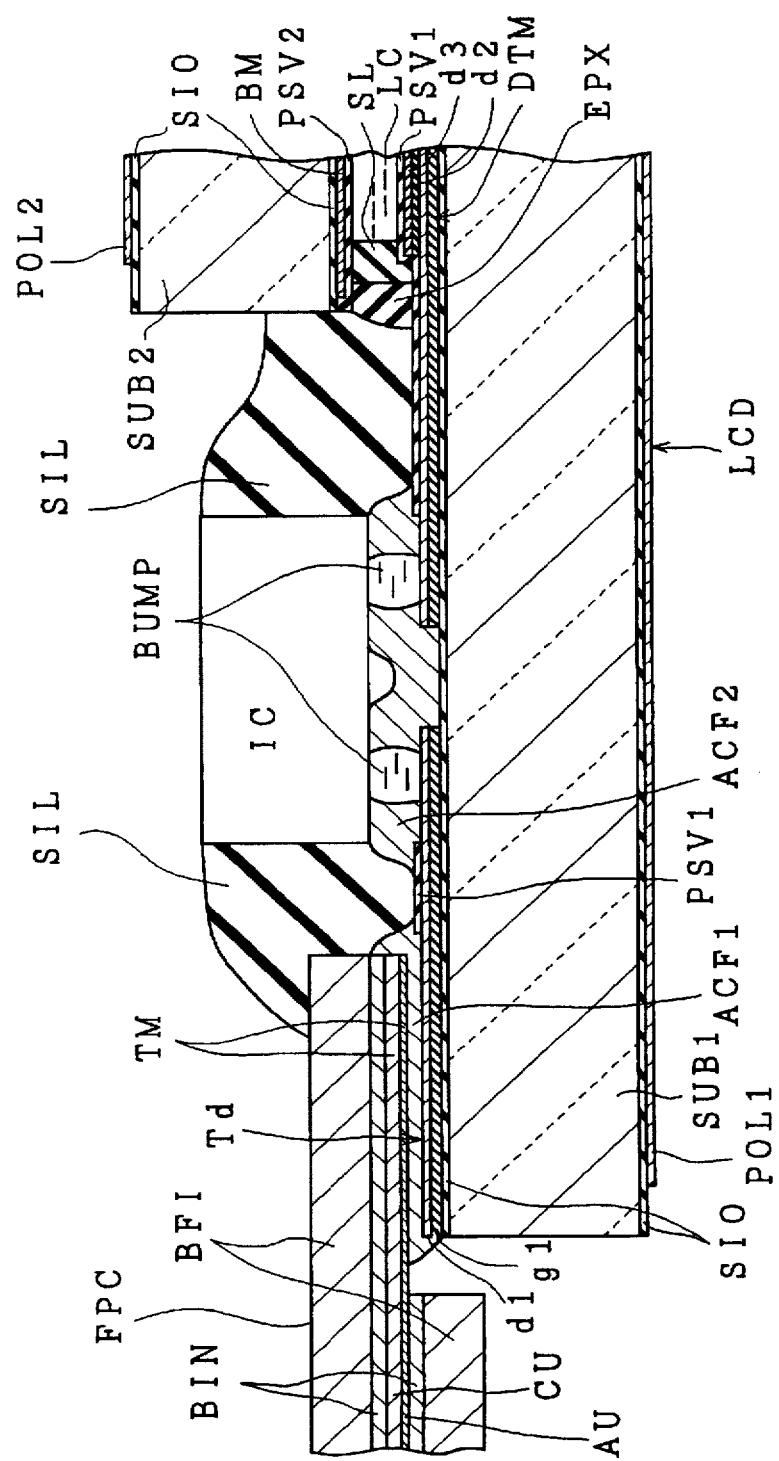
FIG. 15 is a cross-sectional view which is taken along a line A—A of FIG. 14.
Figure 16A:
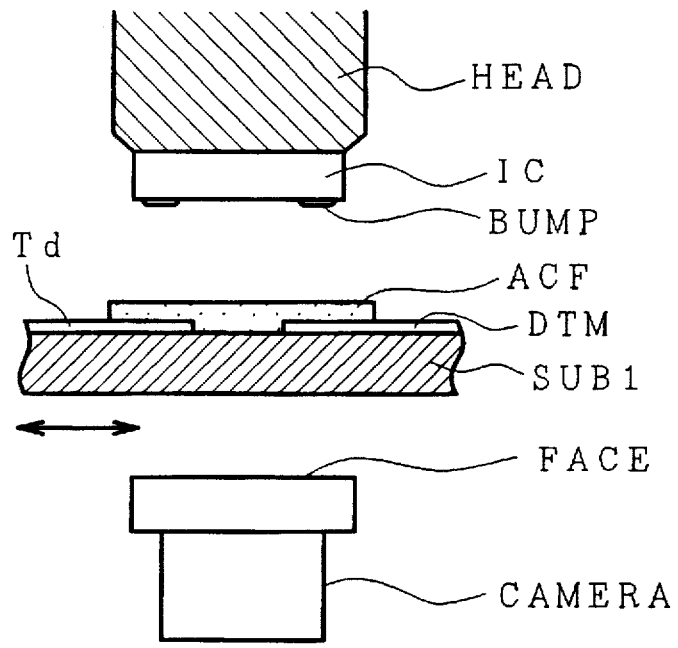
FIGS. 16A and 16B are diagrams showing a method of mounting a driving IC in a flip-chip style.
Figure 16B:
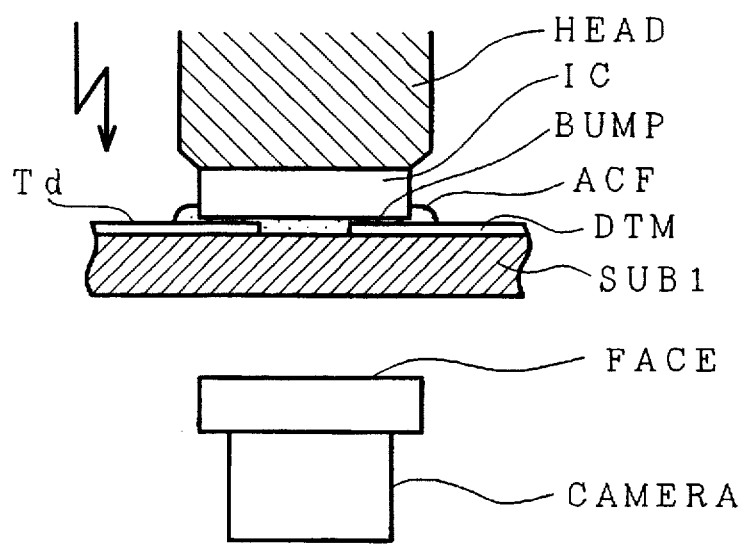

FIG. 14 is a plan view showing such a situation that the driving IC is mounted on the transparent insulating substrate SUB1 formed of glass, and FIG. 15 is a cross-sectional view which is taken along a line A—A of FIG. 14. The other transparent insulating substrate SUB2 as indicated by a one-dotted chain line is located above the transparent insulating substrate SUB1, and liquid crystal LC is sealed therebetween by a seal pattern SL while containing an effective display portion (effective screen area) AR. An electrode COM on the transparent insulating substrate SUB1 is a wire which is to be electrically connected to a common electrode pattern at the transparent insulating substrate SUB2 through conductive beads, silver paste or the like.

A wire DTM (or GTM) serves to supply an output signal from the driving IC to a wire in the effective display portion AR, and an input wire Td serves to supply an input signal to the driving IC. An anisotropic conductive film ACF is formed by separately attaching a slender ACF2 which is shaped commonly to a train of plural driving IC portions and a slender ACF1 which is shaped commonly to input wire pattern portions to the plural driving ICs. A passivation film (protection film) PSV1 is required to be covered on the wire portion as much as possible to prevent electrocorrosion, and an exposed portion of the wire portion is covered by the anisotropic conductive film ACF1.

Further, as shown in FIG. 15, silicone resin SIL is filled around the side surfaces of the driving IC, whereby the protection is multiplexed.

Figure 17:
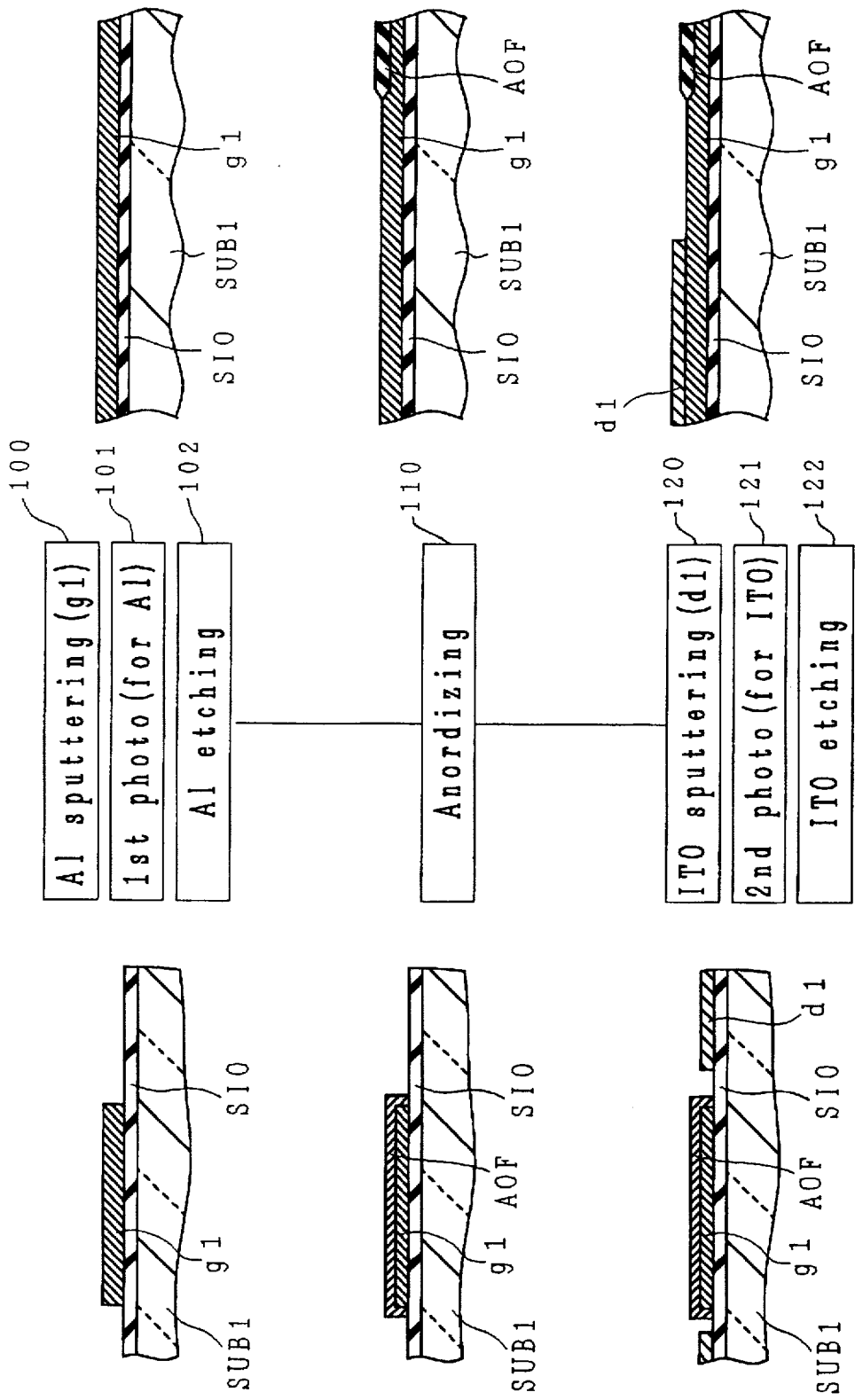
FIGS. 17, 18 and 19 are diagrams showing a manufacturing process of the transparent insulating substrate SUB1.
Figure 18:
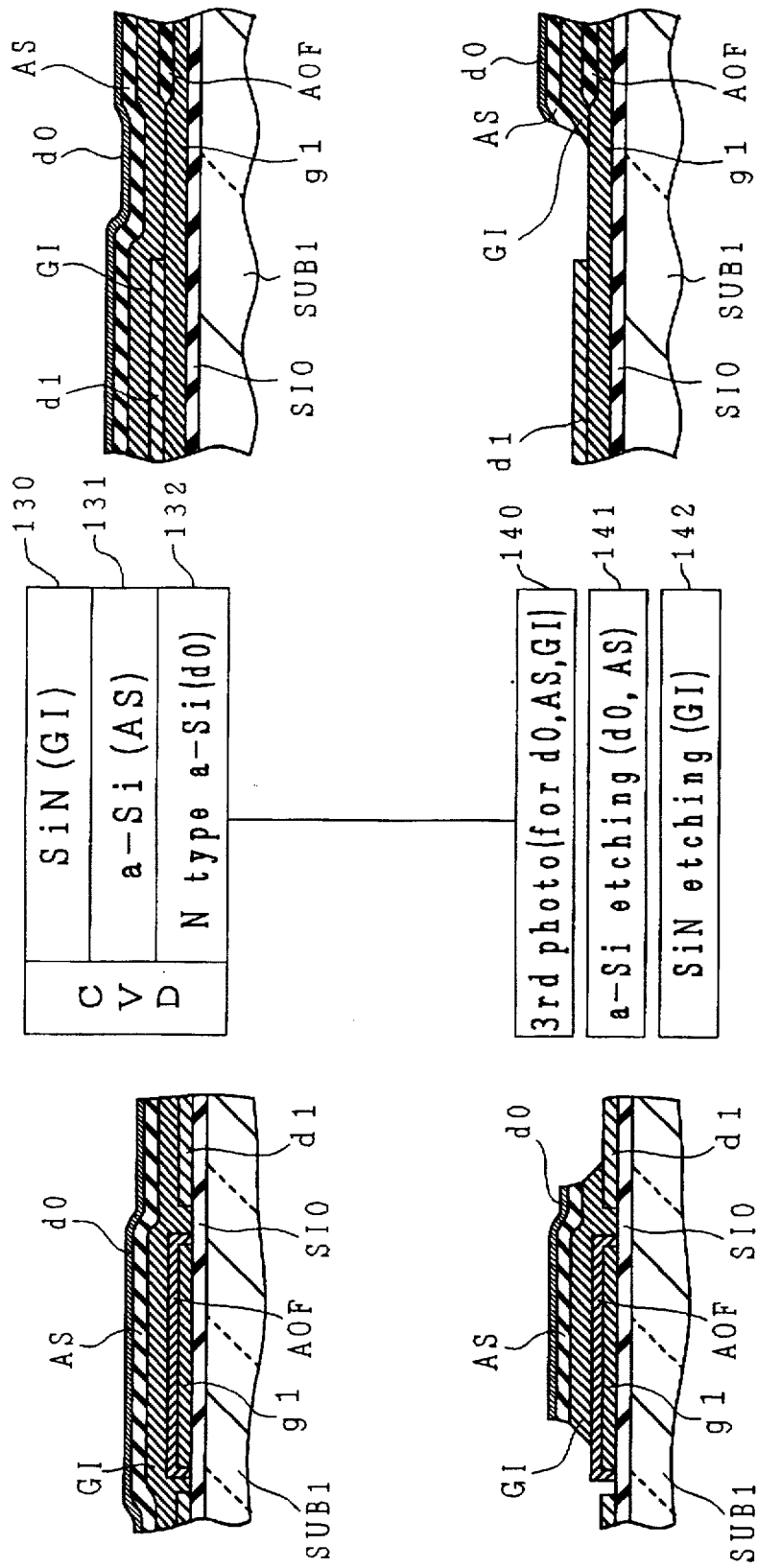
Figure 19:
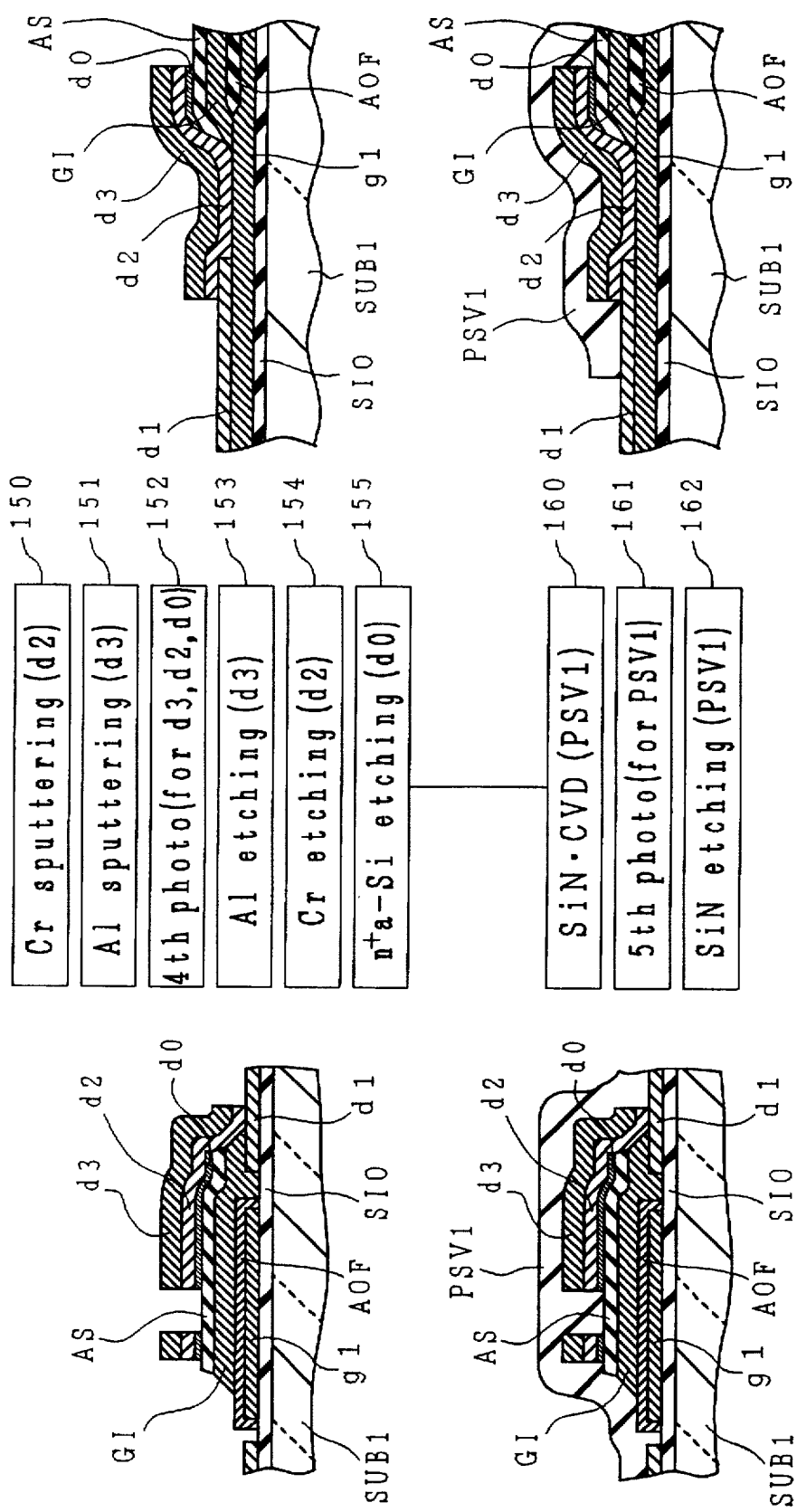

Next, a method of manufacturing the first transparent insulating substrate SUB1 side of the liquid crystal device as described above will be described with reference to FIGS. 17 to 19. In these figures, characters at the center portions represent abbreviated names of processes, and the left sides of the figures are cross-sectional views showing a process flow of a pixel portion while the right sides of the figures are cross-sectional views showing a process flow of the surrounding portion of the gate terminal. Except for steps 110 and 130–132, the other steps are sectioned to meet each photo-process, and the cross-sectional view of each photo-process shows a stage where a working process after the photo-process is finished and a photoresist is removed. In the present invention, the "photo-process" means a series of processes extending from a photoresist coating work through a selective exposure work using a mask to a developing work, and the repetitive description thereof is avoided. These steps will be described in a sectioning order.

(Steps 100 to 102)

A silicon oxide film SIO is formed on both surfaces of a first transparent insulating substrate SUB1 of 7059 glass (trade name) by a dip process, and then baked at 500° C. for 60 minutes. The SIO film is formed to smooth the uneven surface of the transparent insulating substrate SUB1, however, it may be omitted if the unevenness of the surface is little. A first conductive film g1 of Al—Ta, Al—Ti—Ta, Al—Pd or the like is formed at a thickness of 2800 Å by a sputtering method (100). After the photo-process (101) as described above, the first conductive film g1 is selectively etched with mixed acid solution of phosphoric acid, nitric acid and glacial acetic acid (102).

(Step 110)

After a resist is directly drawn (after the anodized pattern as described above is formed), the substrate SUB1 is immersed in anodizing liquid, and it is adjusted so that formation current density is equal to 0.5 mA/cm² (constant current formation). The anodizing liquid is prepared as follows: 3% tartaric acid solution is adjusted to have PH 6.25±0.05 with ammonia, and then it is diluted by ethylene glycol solution in a dilute ratio of 1:9. Subsequently, the anodization (anodic formation) is continued until its formation voltage reaches 125 V at which an $Al_2O_3$ film having a predetermined thickness is obtained, and then it is preferably kept in this state for several tens minutes (constant voltage formation). This is an important factor to obtain an uniform $Al_2O_3$ film. With this process, the conductive film g1 is anodically oxidized, whereby an anodized (anodically oxidized) film AOF of 1800 Å is formed in self-alignment on scanning signal lines GL (gate lines) and the side surfaces thereof, and it serves as a part of the gate insulating film of the thin film transistor TFT.

(Steps 120 and 120)

A conductive film d1 of an ITO film is formed at a thickness of 1400 Å by the sputtering method (120). After the photo-process (121), the conductive film d1 is selectively etched with mixed acid solution of hydrochloric acid and nitric acid (122) to form a gate terminal GTM, the uppermost layer of a drain terminal DTM and a transparent pixel electrode ITO1.

(Steps 130 to 132)

Ammonia, silane gas and nitride gas are introduced into a plasma CVD apparatus to form a nitrated Si film at a thickness of 2000 Å (130), and then silane gas and hydrogen gas are introduced into the plasma CVD apparatus to form an i-type amorphous Si film at a thickness of 2000 Å (131). Thereafter, hydrogen gas and phosphine gas are introduced into the plasma CVD apparatus to form an $N^+$-type amorphous Si film at a thickness of 300 Å (132). This film formation is continuously performed while changing reaction chambers in the same CVD apparatus.

(Steps 140 to 142)

After the photo-process (140), the $N^+$-type amorphous Si film and the i-type amorphous Si film are etched by using $SF_6$ and $CCl_4$ as dry etching gas respectively (141). Subsequently, the nitrated Si film is etched with $SF_6$ (142). The $N^+$-type amorphous Si film, the i-type amorphous Si film and the nitrated Si film may be continuously etched with $SF_6$ gas.

The main feature of the manufacturing process of this embodiment resides in that the CVD films of the three layers are continuously etched with gas containing $SF_6$ as main component. That is, the etching rate under the $SF_6$ gas is reduced in an order from the $N^+$-type amorphous Si film, the i-type amorphous Si film and the nitrated Si film. Accordingly, when the etching of the $N^+$-type amorphous Si film is completed and the etching of the i-type amorphous Si film is started, the $N^+$-type amorphous Si film at the upper portion is side-etched, so that the i-type amorphous Si film is tapered at an angle of about 70 degrees. Further, when the etching of the i-type amorphous Si film is completed and the etching of the nitrated Si film is started, the $N^+$-type amorphous Si film and the i-type amorphous Si film are dry-etched in this order, so that the i-type amorphous Si film is tapered at an angle of 50 degrees and the nitrated silicon film is tapered at an angle of 20 degrees.

The taper structure of the respective films surely reduces the probability of the breaking of wire even when a source electrode SD1 is formed on these tapered films. The taper angle of the $N^+$-type amorphous Si film is near to 90 degrees, however, its thickness is small (300 Å), so that the probability of the breaking of wire at this step is very low.

Accordingly, the planar patterns of the $N^+$-type amorphous Si film, the i-type amorphous Si film and the nitrated Si film are not strictly identical to one another, and the sections of these films are forwardly tapered, so that the patterns of the $N^+$-type amorphous Si film, the i-type amorphous Si film and the nitrated Si film are increased in this order.

(Steps 150 to 155)

A second conductive film d2 of Cr is formed at a thickness of 600 Å by the sputtering method (150), and then a third conductive film d3 of Al—Pd, Al—Si, Al—Ta, Al—Ti—Ta or the like is formed at a thickness of 4000 Å by the sputtering (151). After the photo-process (152), the third conductive film d3 is etched with the same solution as the step 102 (153), and then the second conductive film d2 is etched with cerium (II) ammonium nitrate solution (154) to form a video signal line DL, a source electrode SD1 and a drain electrode SD2. In this embodiment, since the $N^+$-type amorphous Si film, the i-type amorphous Si film and the nitrated Si film are forwardly tapered as shown in steps 140 to 142, these elements may be formed of only the second conductive film d2 in a liquid crystal display device having a large permissible range of the resistance of the video signal line DL.

Subsequently, $SF_6$ and $CCl_4$ are introduced into a dry etching apparatus to etch the $N^+$-type amorphous Si film, thereby selectively removing an $N^+$-type semiconductor layer d0 between the source and drain (156).

(Steps 160 to 162)

Ammonia gas, silane gas and nitrogen gas are introduced into the plasma CVD apparatus to form a nitrated Si film of the 1 μm thickness (160). After the photo-process (161), the nitrated Si film is etched by using $SF_6$ as dry etch gas (162) to form a protection film PSV1. Not only an SiN film formed by CVD, but also an organic material may be used as the protection film.

Figure 20:
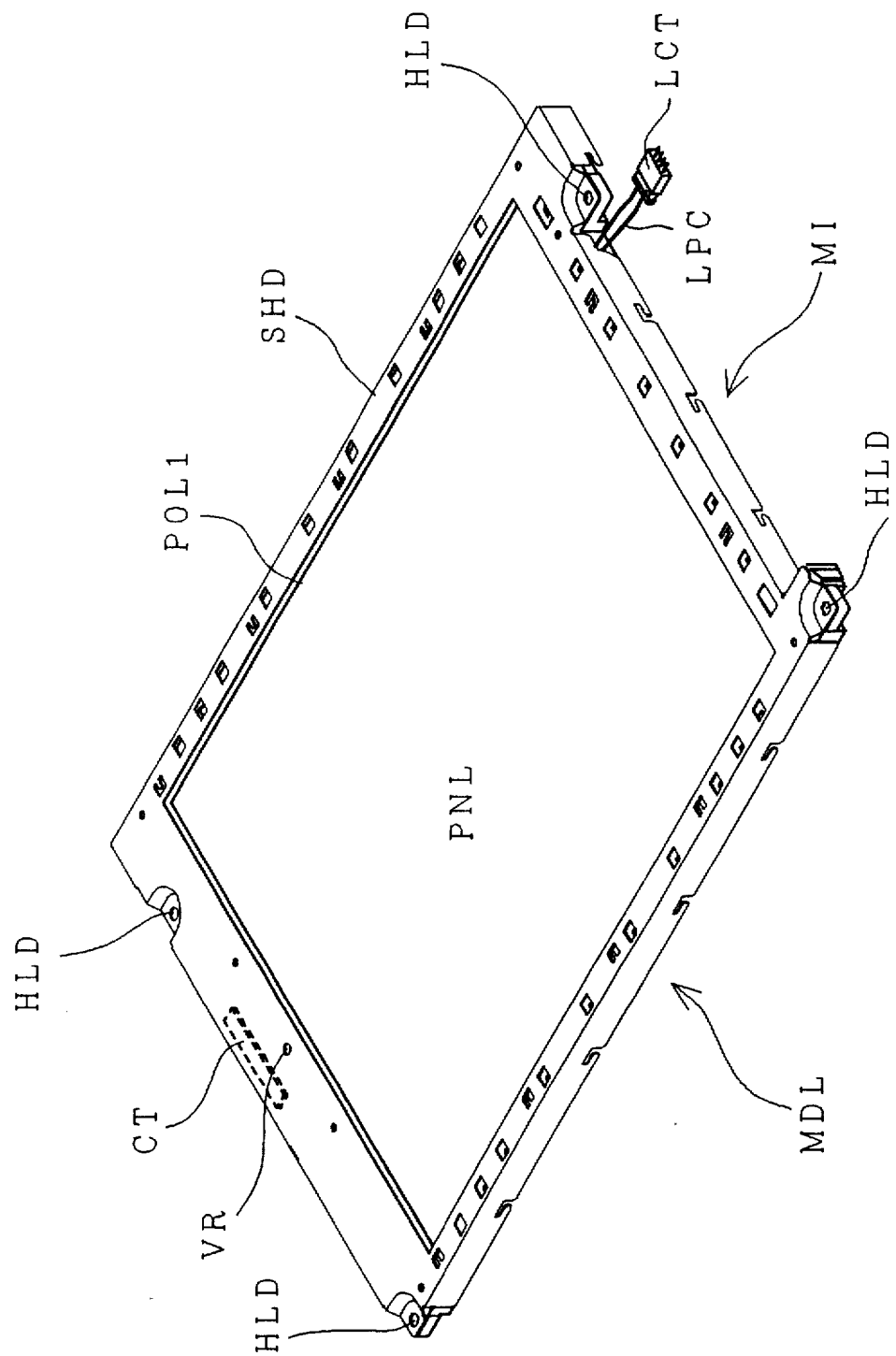
FIG. 20 shows a fabricated product of a liquid crystal display module MDL.

FIG. 20 is a perspective view showing a fabricated product of a liquid crystal display module MDL, which is viewed from the surface side of the liquid crystal display device. The liquid crystal display module MDL has a shield case SHD and two kinds of stock/hold members of a lower side case.

HLD represents four fixing holes which are provided to mount the nodule MDL as a display unit to an information processing apparatus such as a personal computer, a word processor or the like, and the module MDL are fixedly mounted on the information processing apparatus by inserting screws into the holes HLD. The module MDL is provided with a volume VR for adjusting brightness, and an inverter for back light is disposed at an MI portion to supply power through a connection connector LCT and a lamp cable LPC to a back light. Signals output from a main computer (host) and required power are supplied through an interface connector CT disposed on the back surface of the module to a controller and a power source unit of the liquid crystal display module MDL.

Figure 21:
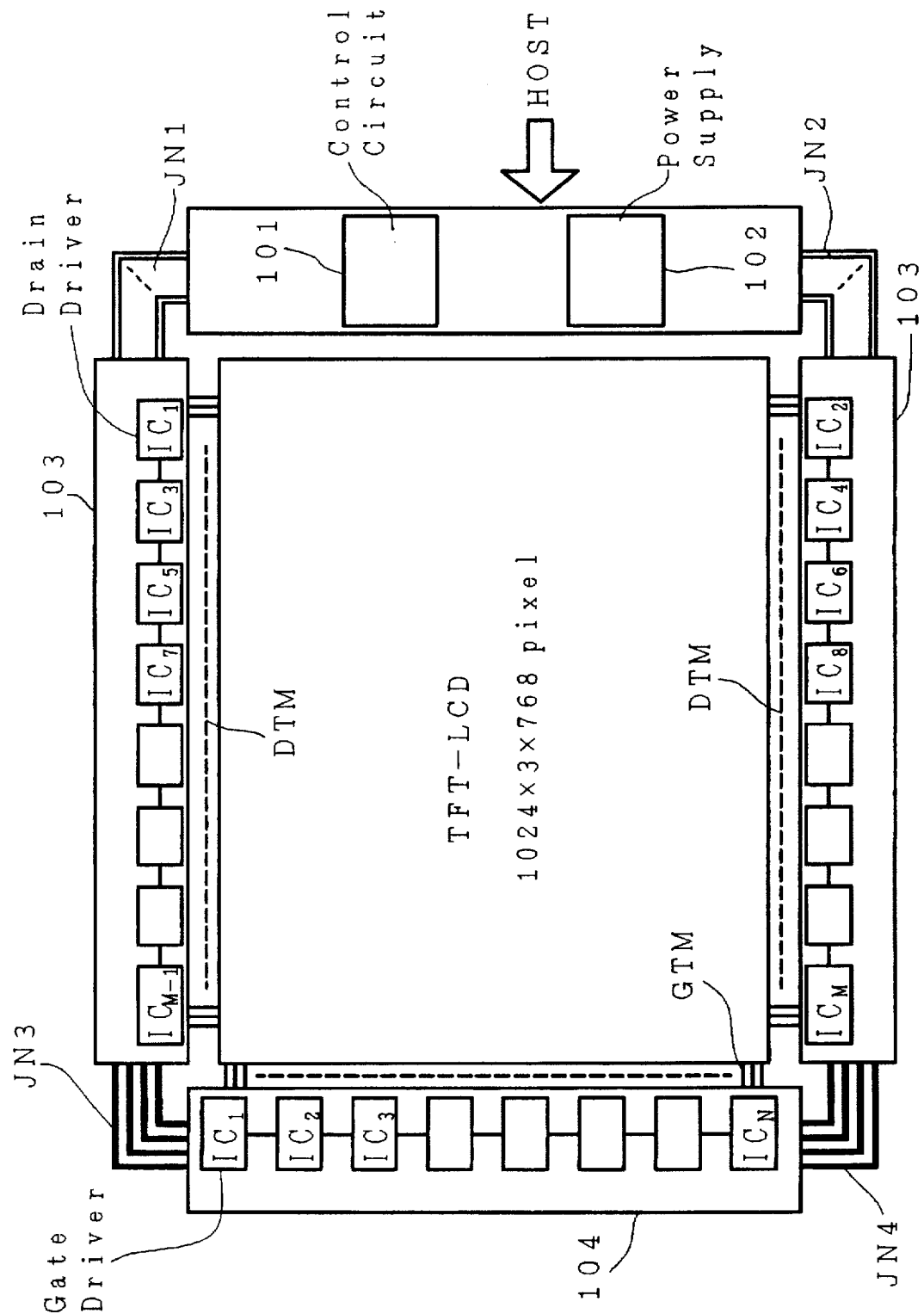
FIG. 21 is a block diagram showing a TFT liquid crystal display device of the TFT liquid crystal display module shown in FIG. 20 (an active matrix type liquid crystal display module using a thin film transistor TFT as a switching element) and circuits disposed at the peripheral portion thereof.

FIG. 21 is a block diagram showing a TFT liquid crystal display device of the TFT liquid crystal display module (an active matrix type liquid crystal display module using a thin film transistor TFT as a switching element) shown in FIG. 20 and circuits arranged around the TFT liquid crystal display device.

In this embodiment, drain drivers $IC_1$ to $IC_M$ and gate drivers $IC_1$ to $IC_N$ are mounted in chip-on-glass style (COG mount) by drain-side drawing lines DTM and gate-side drawing lines GTM formed on one transparent insulating substrate SUB1, and the anisotropic conductive film, ultraviolet-ray setting resin or the like. In this embodiment, the above arrangement is applied to a liquid crystal display device having effective dots of 1024×3×768, which is based on the XGA specification.

Therefore, every eight of drain drivers IC (M=16) each having 192 outputs are arranged at each of confronting long sides on the transparent insulating substrate of the liquid crystal display device in the COG mount style while eight gate drivers IC (N=8) each having 100 outputs are arranged at a short side on the transparent insulating substrate in the COG mount style. A drain driver portion 103 is disposed at each of upper and lower sides of the liquid crystal display device, a gate driver portion 104 is disposed at one side portion of the liquid crystal display device and a controller 101 and a power source unit 102 are disposed at the other side portion of the liquid crystal display device. The controller 101, the power source unit 102, the drain driver portion 103 and the gate driver portion 104 are connected to one another through electrical connecting means JN1 to JN4.

In this embodiment, a TFT liquid crystal display module having 10-inch screen size of 1024×3×768 dots is designed as an XGA panel. Therefore, the size of each dot of red(R), green(G) and blue(B) is equal to 207 µm (gate line pitch)×69 µm (drain line pitch), and each pixel is constructed by a combination of three dots of red(R), green(G) and blue(B) to have 207 µm square. Accordingly, assuming the drain line drawing lines DTM of 1024×3 to be provided at one side, the drawing line pitch is equal to 69 µm or less. This value is less than the lower limit of the connection pitch of a currently-usable tape carriage package (TCP) mount. In the COG mount, the currently-usable minimum value is approximately equal to about 70 µm for the pitch of the bump BUMP of the driving IC, and about 50 µm square for the cross area with the back wire, although these minimum values are dependent on the used materials of the anisotropic conductive film, etc.

Therefore, in this embodiment, the drain driver ICs are aligned at the two confronting long sides of the liquid crystal panel, and the drain lines are alternately drawn to the two long sides so that the pitch of the drain-side drain lines DTM is equal to 69×2 µm. Accordingly, the pitch of the bump BUMP (see FIG. 15) of the driving IC chip can be set to about 100 µm, and the cross area with the back wire can be set to about 70 µm square. Therefore, the connection with the back wire can be performed with higher reliability.

The gate-side drawing lines GTM are drawn at one short side because the gate line pitch is equal to 207 µm which is a sufficient high value, however, when the microstructure becomes finer, the gate-side drawing lines GTM may be alternately drawn to the two confronting two short sides like the drain lines.

The manner of alternately drawing out the drain lines or the gate lines facilitates the connection between the drawing lines DTM or GTM and the BUMP at the output side of the driving IC as described above, however, it is necessary to dispose the peripheral circuit boards at the peripheral portions of the two confronting long sides of the liquid crystal panel PNL as described above. Therefore, the external dimension is larger than that of the one-side drawing manner. Particularly when the number of display colors increases, the number of data lines of display data increases, and the outermost dimension of the information processing device is increased. Accordingly, in this embodiment, the problem of the prior art is solved by using a multilayer flexible board. Further, when the screen size of the XGA panel is above 10 inches, the pitch of the drain-side drawing lines DTM is above about 100 µm, and thus the drain driver ICs can be disposed in the COG mount style at one long side.

The outline of the driving IC used in this embodiment is shown in FIG. 14, and it is designed in a very slender shape to make the shape of the module as small as possible. For example, with respect to the gate-side driving IC, the dimension of the long side is set to about 10 to 11 mm, and the dimension of the short side is set to about 1.5 to 2 mm. With respect to the drain-side driving IC, the dimension of the long side is set to about 15 to 16 mm, and the dimension of the short side is set to about 1.5 to 2 mm. Further, in this embodiment, the output wire pattern between the effective display portion AR and the bum BUMP portion at the output side of the driving IC is extended from three directions of long-side and short-side directions of the driving IC.

For example, according to this embodiment, for the gate-side driving IC, 11 outputs of the 100 outputs of each driving IC are drawn out and wired from two short sides and the residual 78 outputs are drawn and wired from one long side. For the drain-side driving IC, 16 outputs of the 192 outputs of each driving IC are drawn out and wired from two short sides and the residual 160 outputs are drawn out and wired from one long side. The driving IC can be designed to be further slender so that the outputs are drawn out and wired in only the long side direction. In this case, the present invention is applicable.

At the gate side, the distance from the bump BUMP at the output side of the driving IC to the effective display portion AR is equal to about 5.5 mm in the vicinity of the D—D output wire and it is increased to about 10 mm in the vicinity of the B—B output wire. Further, at the drain side, the distance is equal to about 4.3 mm in the vicinity of the D—D output wire, and it is increased to about 8.5 mm in the vicinity of the B—B output wire. Therefore, assuming that the thickness of this portion is equal to 1400 Å, the wiring is performed by only the transparent conductive film ITO having resistivity of about 20Ω/□ and its width is equal to 30 µm, a 1 mm difference in wiring length makes a resistance difference of about 667Ω. Accordingly, a resistance difference of about 3 kΩ occurs at the gate side, and a resistance difference of about 2.8 kΩ occurs at the drain side. Accordingly, the distortion amount of the output waveform of the driving IC is varied every wiring, and this finally causes unevenness of a display image.

Figure 22:
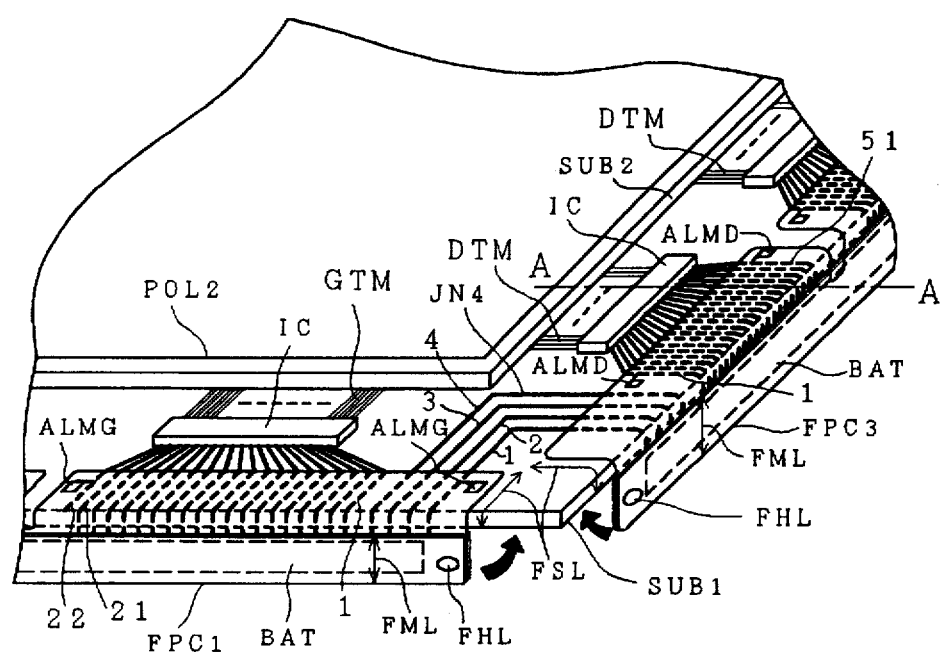
FIG. 22 is a perspective view showing a method of mounting a bendable multilayered flexible substrate FPC on the liquid crystal display while bending the multilayered flexible substrate FPC.

FIG. 22 is a perspective view showing a method of mounting a bendable multilayer flexible board FPC on the liquid crystal display device by bending the multilayer flexible board FPC. The flexible board FPC is designed in a bendable multilayer structure, and it is mechanically and electrically connected through the anisotropic conductive film (see the reference numeral ACF1 of FIG. 14) onto the end portion of the lower transparent insulating substrate of the liquid crystal display device. The flexible board FPC is mounted while bent in a direction as indicated by an arrow.

The mounting method as described above is performed as follows. The anisotropic conductive film ACF1 is attached to the surface of the connection portion of the lower transparent insulating substrate SUB1, holes FHL of the flexible boards FPC are temporarily fixed to positioning pins of a jig, and the holes of the flexible board FPC are positionally matched with open holes to perform a roughly positioning of the work. In order to enhance the precision of the positioning, square painted patterns are disposed at the substrate SUB1 side. Thereafter, the flexible board is temporarily thermally pressed by a heat seal while the positions of the square painted patterns are adjusted to be located in frame-shaped positioning patterns ALMG and ALMD at the flexible substrate FPC side. After it is checked that no positional displacement occurs between these patterns, the flexible board is fully thermally pressed to fix the flexible board FPC onto the substrate SUB1.

The anisotropic conductive film ACF1 is used because a number of wires (about 45 wires) are required to be provided for input signals to the driving IC and the power source voltage, and it is difficult to solder the flexible board to the substrate SUB1 because the pitch P between the input wires is very small (about 400 µm), so that the electrical connection cannot be performed with high reliability. Therefore, according to the present invention, even when the number of pixels or the number of display colors increases to narrow the inter-wire pitch, the flexible board and the substrate can be electrically connected with high reliability.

Figure 23A:
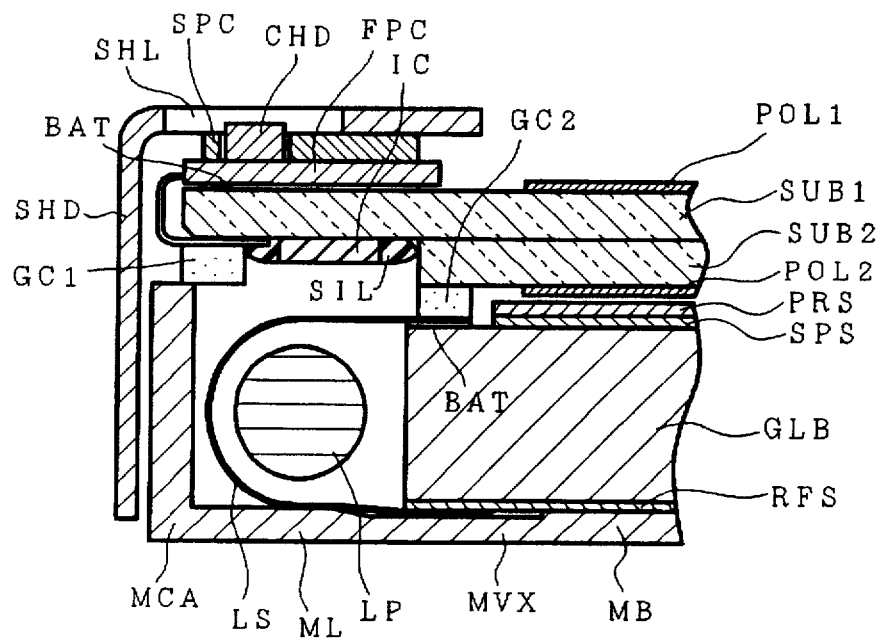
FIGS. 23A and 23B are cross-sectional views showing main parts of the liquid crystal display modules.
Figure 23B:
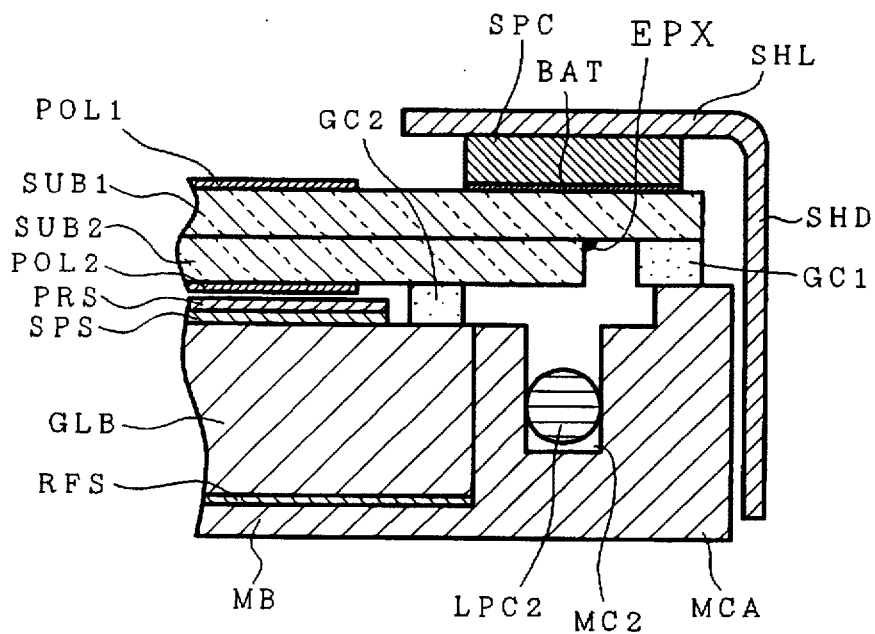

FIGS. 23A and 23B are cross-sectional views showing a main part of the liquid crystal display module.

As shown in FIGS. 23A and 23B, a shield case SHD, an insulating spacer SPC, a rubber cushion GC, a polarizer POL, a prism sheet PRS, a diffusion sheet SPS, a light guide board, a reflection sheet RFS, a lower-side mold case MCA, a fluorescent tube (lamp) LP, a lamp cable LPC, etc. are vertically arranged in a laminate structure in a liquid crystal display device having driving circuits in which the flip-chip style and the multilayer flexible board are used in combination, thereby fabricating a liquid crystal display module.

What is claimed is:

1. A liquid crystal display device having driving circuits mounted on a substrate, comprising:

two transparent insulating substrates which are disposed to confront each other through a liquid crystal layer;

plural liquid crystal driving circuits which are mounted in a flip-chip style on a surface of one of said substrates which is located at the side of said liquid crystal layer;

a flexible board for inputting a signal to each of said liquid crystal driving circuits; and plural input wires which are provided on the surface of said one substrate at the side of said liquid crystal layer, and which serve to connect output terminals of said flexible board to input terminals of said liquid crystal driving circuits, wherein each of said input wires includes a first metal layer in the vicinity of the surface of said one substrate, a transparent conductive film which is laminated on said first metal layer and connected to the input terminals of said liquid crystal driving circuits and the output terminals of said flexible board, said transparent conductive film having open portions in the neighborhood of the input terminals of said liquid crystal driving circuits and in the neighborhood of the output terminals of said flexible board, a second metal layer which is at least partially laminated on said transparent conductive film and which is connected to said first metal layer at said open portions, and a protection film which is disposed to cover at least said second metal layer.

2. The liquid crystal display device according to claim 1, wherein said first metal layer is formed of the same material as a gate line of a thin film transistor which is provided for every pixel of the liquid crystal display device, wherein said second metal layer is formed of the same material as a drain line of said thin film transistor, and wherein said transparent conductive film is formed of ITO (Indium Tin oxide).

3. The liquid crystal display device according to claim 1, wherein said first metal layer is formed of any one of materials selected from the group consisting of an alloy of aluminum and tantalum (Al—Ta), an alloy of aluminum, titanium and tantalum (Al—Ti—Ta) and an alloy of aluminum and lead (Al—Pd), and wherein said second metal layer is formed of metals including at least chromium (Cr), and said transparent conductive film is formed of ITO (Indium Tin Oxide).

4. The liquid crystal display device according to claim 1, wherein a planar pattern of said second metal layer is comb-shaped or ladder-shaped at a connection portion between said output terminals of said flexible board and said input wires.

5. The liquid crystal display device according to claim 3, wherein a third metal layer which has substantially the same shape as said second metal layer is formed between said second metal layer and said protection film, and said third metal layer is formed of any one of materials selected from the group consisting of an alloy of aluminum and lead (Al—Pd), an alloy of aluminum and silicon (Al—Si), an alloy of aluminum and tantalum (Al—Ta) and an alloy of aluminum, titanium and tantalum (Al—Ti—Ta).

6. A liquid crystal display device having driving circuits mounted on a substrate, comprising:

two transparent insulating substrates which are disposed to confront each other through a liquid crystal layer;

plural liquid crystal driving circuits which are mounted in a flip-chip style on a surface of one of said substrates which is located at the side of said liquid crystal layer;

a flexible board for inputting a signal to each of said liquid crystal driving circuits; and plural input wires which are provided on the surface of said one substrate at the side of said liquid crystal layer, and which serve to connect output terminals of said flexible board to input terminals of said liquid crystal driving circuits, wherein each of said input wires includes a first metal layer in the vicinity of the surface of said one substrate, a transparent conductive film which is laminated on said first metal layer and connected to the input terminals of said liquid crystal driving circuits and the output terminals of said flexible board, said transparent conductive film having open portions in the neighborhood of the input terminals of said liquid crystal driving circuits and in the neighborhood of the output terminals of said flexible board, a second metal layer which is at least partially laminated on said transparent conductive film and connected to said first metal layer at said open portions, and a protection film which is disposed to cover at least said second metal layer, and wherein a projecting layer of said second metal layer is disposed in the neighborhood of a connection portion between said input terminals of said liquid crystal driving circuits and said transparent conductive film so as to be parallel to the longitudinal direction of said input terminals.

7. The liquid crystal display device according to claim 6, wherein the connection portion between each of said input terminals of said liquid crystal driving circuits and said transparent conductive film is divided into plural parts by said projecting layer of said second metal layer.

8. The liquid crystal display device according to claim 6, wherein said first metal layer is not disposed in an area in the neighborhood of said connection portion between each of said input terminals of said liquid crystal driving circuits and said transparent conductive film.

9. The liquid crystal display device according to claim 6, wherein at the connection portion between each of said input terminals of said liquid crystal driving circuits and said transparent conductive film, a portion of said first metal layer having a larger area than said connection portion is disposed between side transparent conductive film and said substrate.

10. The liquid crystal display device according to the claim 6, wherein said first metal layer is formed of the same material as a gate line of a thin film transistor which is provided for every pixel of the liquid crystal display device, wherein said second metal layer is formed of the same material as a drain line of said thin film transistor, and wherein said transparent conductive film is formed of ITO (Indium Tin oxide).

11. The liquid crystal display device according to claim 6, wherein said first metal layer is formed of any one of materials selected from the group consisting of an alloy of aluminum and tantalum (Al—Ta), an alloy of aluminum, titanium and tantalum (Al—Ti—Ta) and an alloy of aluminum and lead (Al—Pd), wherein said second metal layer is formed of metals including at least chromium (Cr), and wherein said transparent conductive film is formed of ITO (Indium Tin Oxide).

12. The liquid crystal display device according to claim 6, wherein a planar pattern of said second metal layer is comb-shaped or ladder-shaped at a connection portion between said output terminals of said flexible board and said input wires.

13. The liquid crystal display device according to claim 11, wherein a third metal layer which has substantially the same shape as said second metal layer is formed between said second metal layer and said protection film, and said third metal layer is formed of any one of materials selected from the group consisting of an alloy of aluminum and lead (Al—Pd), an alloy of aluminum and silicon (Al—Si), an alloy of aluminum and tantalum (Al—Ta) an and alloy of aluminum, titanium and tantalum (Al—Ti—Ta).

\* \* \* \* \*